(12) United States Patent
Higginbotham et al.

(10) Patent No.: US 10,254,042 B2
(45) Date of Patent: Apr. 9, 2019

(54) PURIFICATION OF CARBON DIOXIDE

(71) Applicant: Air Products and Chemicals, Inc., Allentown, PA (US)

(72) Inventors: Paul Higginbotham, Surrey (GB); Galip Hakan Guvelioglu, Macungie, PA (US); John Eugene Palamara, Macungie, PA (US); Vincent White, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1324 days.

(21) Appl. No.: 14/063,047

(22) Filed: Oct. 25, 2013

(65) Prior Publication Data
US 2015/0114033 A1   Apr. 30, 2015

(51) Int. Cl.
*F25J 3/08* (2006.01)
*B01D 53/00* (2006.01)
*C01B 17/16* (2006.01)
*F25J 3/02* (2006.01)
*B01D 53/75* (2006.01)
*C01B 32/50* (2017.01)

(52) U.S. Cl.
CPC .............. *F25J 3/08* (2013.01); *B01D 53/002* (2013.01); *B01D 53/75* (2013.01); *C01B 17/167* (2013.01); *C01B 32/50* (2017.08); *F25J 3/029* (2013.01); *F25J 3/0266* (2013.01); *B01D 2257/302* (2013.01); *B01D 2257/304* (2013.01); *B01D 2257/306* (2013.01); *B01D 2257/308* (2013.01); *B01D 2257/404* (2013.01); *B01D 2257/406* (2013.01); *B01D 2257/7022* (2013.01); *F25J 2200/04* (2013.01); *F25J 2200/08* (2013.01); *F25J 2200/10* (2013.01); *F25J 2200/40* (2013.01); *F25J 2200/50* (2013.01); *F25J 2200/70* (2013.01); *F25J 2200/74* (2013.01); *F25J 2200/76* (2013.01); *F25J 2200/78* (2013.01); *F25J 2205/02* (2013.01); *F25J 2205/30* (2013.01); *F25J 2205/40* (2013.01); *F25J 2205/80* (2013.01); *F25J 2220/82* (2013.01); *F25J 2220/84* (2013.01);
(Continued)

(58) Field of Classification Search
CPC .............. F25J 3/0266; F25J 2220/80–2220/84
See application file for complete search history.

(56) References Cited

U.S. PATENT DOCUMENTS 3,417,572 A   12/1968   Pryor
3,643,451 A   2/1972   Foucar
(Continued)

FOREIGN PATENT DOCUMENTS

CN   101765559   6/2010
CN   102847414   1/2013
(Continued)

*Primary Examiner* — Tareq Alosh
(74) *Attorney, Agent, or Firm* — Amy Carr-Trexler

(57) ABSTRACT

In a process for separating at least one "heavy" impurity such as hydrogen sulfide from crude carbon dioxide comprising significant quantities of at least one "light" impurity such as non-condensable gases, involving at least one heat pump cycle using carbon dioxide-containing fluid from the process as the working fluid, the "light" impurity is removed from the crude carbon dioxide and carbon dioxide is subsequently recovered from the removed "light" impurity, thereby improving overall carbon dioxide recovery and efficiency in terms of energy consumption.

34 Claims, 12 Drawing Sheets

(52) U.S. Cl.
CPC ........ *F25J 2230/80* (2013.01); *F25J 2235/02* (2013.01); *F25J 2235/80* (2013.01); *F25J 2240/40* (2013.01); *F25J 2245/02* (2013.01); *F25J 2260/20* (2013.01); *F25J 2260/80* (2013.01); *F25J 2270/02* (2013.01); *F25J 2270/80* (2013.01); *F25J 2270/88* (2013.01); *F25J 2290/40* (2013.01); *Y02B 30/52* (2013.01); *Y02C 10/12* (2013.01); *Y02P 20/124* (2015.11); *Y02P 20/129* (2015.11); *Y02P 20/152* (2015.11)

(56) References Cited

U.S. PATENT DOCUMENTS

| | | |
|---|---|---|
| 4,371,381 A | 2/1983 | Schuftan |
| 4,710,213 A | 12/1987 | Sapper et al. |
| 5,960,644 A | 10/1999 | Nagelvoort et al. |
| 6,499,312 B1 * | 12/2002 | Bergman, Jr. ........ F25J 3/04284 62/643 |
| 7,666,251 B2 | 2/2010 | Shah et al. |
| 2006/0260189 A1 * | 11/2006 | Reddy ................. B01D 53/002 48/128 |
| 2008/0196587 A1 * | 8/2008 | Ha ........................ F25J 3/0266 95/204 |
| 2009/0013717 A1 | 1/2009 | Darde et al. |
| 2013/0004406 A1 | 1/2013 | Chung et al. |
| 2013/0283851 A1 | 10/2013 | Higginbotham et al. |

FOREIGN PATENT DOCUMENTS

| | | |
|---|---|---|
| DE | 1467055 A1 | 1/1969 |
| EP | 0503910 | 3/1992 |
| GB | 971362 | 6/1962 |
| WO | 8102291 | 8/1981 |
| WO | 2008086265 A1 | 7/2008 |

\* cited by examiner

PURIFICATION OF CARBON DIOXIDE

BACKGROUND OF THE INVENTION

The present invention relates to processes and apparatus for the purification of carbon dioxide. In particular, the invention relates to processes and apparatus for the removal of at least one "heavy" impurity from crude carbon dioxide by mass transfer separation at sub-ambient temperatures and super-atmospheric pressures. The invention has particular application to the purification of crude carbon dioxide comprising significant amounts of at least one "light" impurity.

By "light" impurity, the Inventors are referring to an impurity that is more volatile than carbon dioxide. Examples of "light" impurities include nitrogen ($N_2$), oxygen ($O_2$), argon (Ar), hydrogen ($H_2$), helium (He); methane ($CH_4$); carbon monoxide (CO), neon (Ne), xenon (Xe), krypton (Kr), nitric oxide (NO) and nitrous oxide ($N_2O$).

By "heavy" impurity, the Inventors are referring to an impurity that is less volatile than carbon dioxide. Examples of "heavy" impurities include hydrogen sulfide ($H_2S$); methanol (MeOH); C3-C8 hydrocarbons such as propane; carbon disulfide ($CS_2$); carbon oxysulfide (COS); dimethyl sulfide (Me2S) and other organic sulfur compounds; nitrogen dioxide ($NO_2$); sulfur dioxide ($SO_2$); sulfur trioxide ($SO_3$); and ammonia ($NH_3$).

C2 hydrocarbons such as ethane, ethylene and acetylene form azotropic mixtures with carbon dioxide so they can behave as "light" impurities or "heavy" impurities depending on concentration.

Carbon dioxide from naturally occurring carbon dioxide sources, such as natural carbon dioxide fields and natural gas deposits, is used for enhanced oil recovery (EOR) in some areas of the world. Some of these sources contain hydrogen sulfide, which is undesirable for pipeline transport since hydrogen sulfide is toxic and corrosive in the presence of water. In addition, it is not desirable to introduce hydrogen sulfide to the crude oil that is being extracted by the EOR process.

Processes for the removal of hydrogen sulfide from carbon dioxide are known. For example, U.S. Pat. No. 3,417,572A (Pryor, 1968) discloses a method of treating hydrogen-rich gas comprising carbon dioxide and hydrogen sulfide. The hydrogen sulfide and carbon dioxide are condensed and separated from the hydrogen-rich gas. The condensed gases are then fed to a distillation column for separation into an essentially hydrogen sulfide-free carbon dioxide overhead vapor and a bottoms liquid containing at least 10 vol. % hydrogen sulfide. The separated hydrogen-rich gas is scrubbed to remove any residual carbon dioxide and hydrogen sulfide which is then also fed to the distillation column. Overhead vapor is condensed using an external closed cycle of propane refrigerant and bottoms liquid is re-boiled using process cooling water. The distillation column has 100 trays and operates at about 590 psia (~41 bar) so that the overhead temperature is 42° F. (~6° C.) and the bottom temperature is about 45° F. (~7° C.).

U.S. Pat. No. 3,643,451 A (Foucar, 1972) discloses a method of producing high purity, high pressure carbon dioxide from a concentrated low pressure mixture of acid gases. The gaseous mixture is compressed, cooled and condensed and fed to a distillation column where it is separated into a high purity (at least 99.95%) carbon dioxide overhead vapor and a bottoms liquid containing condensed sulfur-containing gases. The overhead vapor is condensed using an external closed cycle of ammonia refrigerant and refrigeration duty for cooling and condensing the feed is provided by vaporizing bottoms liquid, carbon dioxide overhead liquid and the external refrigerant. The distillation column system operates at about 300 to 350 psia (~21 to 24 bar) so that the overhead temperature is −5 to −10° F. (~−21 to −24° C.) and the bottoms temperature is 40 to 70° F. (~5 to 21° C.). A bottoms product of 97% hydrogen sulfide is produced in the example.

WO81/02291A (Schuftan, 1981) discloses a method for separating a gas mixture comprising carbon dioxide, at least one gas having a lower boiling point than carbon dioxide and at least one impurity (typically hydrogen sulfide) having a higher boiling point than carbon dioxide. The gas mixture is cooled and distilled in a first column to a product gas free of the impurity and a liquid fraction containing the impurity. Pure carbon dioxide is obtained in a second distillation column, which operates slightly above the triple point pressure (~518 kPa) of carbon dioxide. Liquid product from the first column is flashed at an intermediate pressure to remove dissolved light impurities, then further reduced in pressure and evaporated before being fed to the second column as vapor. The carbon dioxide overhead vapor is practically free of impurities and the bottoms liquid fraction is rich in impurities, typically containing sulfur compounds (primarily hydrogen sulfide) at a plurality of up to 50 vol. %. Reflux and re-boil are effected by a heat pump cycle which uses purified carbon dioxide as the working fluid. The working fluid is passed through a compressor, a heat exchanger and a re-boiler immersed in the bottoms liquid, where it is condensed before being fed back to the top of the column as reflux. A substantially pure carbon dioxide product is withdrawn from the circulating carbon dioxide immediately upstream of the compressor at a pressure of about 5 atm. and at near-ambient temperature.

The Inventors have also developed a process for the removal of "heavy" impurities such as hydrogen sulfide from crude carbon dioxide. The process is described in co-pending U.S. patent application Ser. No. 13/456,854 filed on 26 Apr. 2012, the disclosure of which is incorporated herein by reference. In that process, "heavy" impurities are removed from crude carbon dioxide by sub-ambient temperature distillation of crude carbon dioxide in a distillation column system operating at superatmospheric pressure(s) to produce carbon dioxide-enriched overhead vapor and a bottoms liquid enriched with the "heavy" impurities. The Inventors discovered that, where such processes involve at least one heat pump cycle using as working fluid carbon dioxide-containing fluid from the distillation system, significant savings in power consumption are realized when the process uses more than one recycle pressure in the heat pump cycles(s).

In addition to the "heavy" impurities, crude carbon dioxide can also contain significant quantities of "light" impurities. The "light" impurities tend to concentrate in the carbon dioxide product. Thus, depending on the purity specification of the carbon dioxide product, it may be necessary to also remove these "light" impurities from the carbon dioxide. Most conventional processes remove the "light" impurities from the carbon dioxide product. However, U.S. Pat. No. 3,417,572A and WO81/02291A (discussed above) are examples of prior art references that disclose processes for removing the "light" impurities before the "heavy" impurities.

GB971362 (Ruhemann, 1964) discloses a process for the removal of both "light" and "heavy" impurities from natural sources of carbon dioxide. Crude carbon dioxide feedstock at 30° C. and 110 atm is cooled and condensed moisture removed. The gas is then dried, and cooled by indirect heat exchange to form partially condensed feedstock which is expanded to 20 atm and then fed to the lower column of a double fractionating column where it is separated into "light" impurity-enriched overhead and liquid carbon dioxide containing the "heavy" impurities. The overhead is removed, expanded and removed from the process. The liquid carbon dioxide is expanded to 8 atm and fed to the upper column of the double column where it is separated to produce carbon dioxide overhead vapor and "heavy" impurities-enriched bottoms liquid. The carbon dioxide gas is condensed and removed as liquid product, and the bottoms liquid containing the "heavy" impurities is expanded and removed from the process with the "light" impurities.

BRIEF SUMMARY OF THE INVENTION

It is an objective of the present invention to provide a process for purifying crude carbon dioxide comprising not only one or more "heavy" impurity but also a significant quantity of one or more "light" impurity.

It is an object of preferred embodiments of the present invention to provide a more efficient process for removal of said impurities when compared to conventional processes in which "light" impurities are removed from carbon dioxide either before or after the "heavy" impurities are removed.

It is also an object of preferred embodiments of the present invention to provide a process for the removal of said impurities from crude carbon dioxide that consumes less energy when compared to such conventional processes.

It is a further object of preferred embodiments of the present invention to improve the overall recovery of carbon dioxide, ideally while maintaining or even improving purity.

In addition, it is an object of preferred embodiments of the present invention to provide a simplified process by eliminating the need for external refrigerant systems.

According to a first aspect of the present invention, there is provided a process for purifying crude carbon dioxide fluid comprising at least one "light" impurity and at least one "heavy" impurity, said process comprising:
  cooling said crude carbon dioxide fluid above the triple point pressure of carbon dioxide by indirect heat exchange to produce cooled crude carbon dioxide fluid;
  feeding said cooled crude carbon dioxide fluid to a first column system for mass transfer separation to produce "light" impurity-enriched overhead vapor and "light" impurity-depleted carbon dioxide bottoms liquid comprising said "heavy" impurity;
  re-boiling said first column system by vaporizing "light" impurity-depleted bottoms liquid by indirect heat exchange to provide vapor for said first column system;
  feeding "light" impurity-depleted bottoms liquid from said first column system to a second column system for mass transfer separation to produce carbon dioxide-enriched overhead vapor and "heavy" impurity-enriched bottoms liquid;
  providing carbon dioxide-enriched liquid as reflux for said second column system;
  re-boiling said second column system by indirect heat exchange to provide vapor for said second column system;
  wherein said first and second column systems operate above the triple point pressure and below the critical pressure of carbon dioxide;
  wherein said process comprises at least one heat pump cycle using as working fluid carbon dioxide-containing fluid from said second column system;
  wherein said second column system is re-boiled by at least partially vaporizing at least one "heavy" impurity-enriched liquid in or taken from said second column system by indirect heat exchange against carbon dioxide-containing vapor from said second column system; and
  wherein said overhead vapor from said first column system comprises carbon dioxide and at least a portion of said carbon dioxide is recovered from said overhead vapor to produce "light" impurity-rich residual gas and recovered carbon dioxide.

Suitable "heavy" impurity-enriched liquids in or taken from the second column system include "heavy" impurity-enriched bottoms liquid; and "heavy" impurity-enriched liquid(s) in or taken from at least one intermediate location in the second column system (i.e. "intermediate liquid").

According to a second aspect of the present invention, there is provided apparatus for purifying crude carbon dioxide fluid comprising at least one "light" impurity and at least one "heavy" impurity, said apparatus comprising:
  a first heat exchanger for cooling said crude carbon dioxide fluid by indirect heat exchange to produce cooled crude carbon dioxide fluid;
  a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;
  a second column system in fluid flow communication with said first column system for separating said bottoms liquid from said first column system by mass transfer separation to produce carbon dioxide-enriched overhead vapor and bottoms liquid enriched with said heavy impurity;
  a second heat exchanger in fluid flow communication with said second column system for warming carbon dioxide-enriched overhead vapor from said second column system by indirect heat exchange to produce warmed carbon dioxide-enriched gas;
  a first compressor in fluid flow communication with said second heat exchanger for compressing said warmed carbon dioxide-enriched gas to produce compressed carbon dioxide-enriched recycle gas;
  a third heat exchanger in fluid flow communication with said first compressor for cooling and at least partially condensing said compressed carbon dioxide-enriched recycle gas by indirect heat exchange to form at least partially condensed carbon dioxide-enriched liquid;
  a first pressure reduction arrangement in fluid flow communication with said third heat exchanger for expanding said at least partially condensed carbon dioxide-enriched liquid;
  a conduit arrangement for providing at least partially condensed carbon dioxide-enriched liquid from said first pressure reduction arrangement to said second column system as reflux; and
  a carbon dioxide recovery system in fluid flow communication with said first column system for recovering carbon dioxide from said overhead vapor from said first column system to produce "light" impurity-rich residual gas and recovered carbon dioxide,
  wherein said third heat exchanger is arranged to re-boil said second column system by vaporizing "heavy" impurity-enriched liquid in or taken from said second column system by said indirect heat exchange against said condensing carbon dioxide recycle gas.

Also according to the second aspect of the present invention, there is provided apparatus for purifying crude carbon dioxide fluid comprising at least one "light" impurity and at least one "heavy" impurity, said apparatus comprising:

a first heat exchanger for cooling said crude carbon dioxide fluid by indirect heat exchange to produce cooled crude carbon dioxide fluid;

a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;

a second column system in fluid flow communication with said first column system for separating said bottoms liquid from said first column system by mass transfer separation to produce carbon dioxide-enriched overhead vapor and bottoms liquid enriched with said heavy impurity;

a first pressure reduction arrangement in fluid flow communication with said second column system for expanding "heavy" impurity-enriched liquid from said second column system to produce expanded "heavy" impurity-enriched liquid;

a second heat exchanger in fluid flow communication with said first pressure reduction arrangement for at least partially vaporizing said expanded "heavy" impurity-enriched liquid by indirect heat exchange to produce expanded "heavy" impurity-enriched gas;

a first compressor in fluid flow communication with said second heat exchanger for compressing said expanded "heavy" impurity-enriched gas to produce compressed "heavy" impurity-enriched recycle gas;

a third heat exchanger in fluid flow communication with said first compressor for cooling said compressed "heavy" impurity-enriched recycle gas by indirect heat exchange to form cooled "heavy" impurity-enriched recycle gas;

a conduit arrangement for feeding said cooled "heavy" impurity-enriched recycle gas from said third heat exchanger to said second column system; and a carbon dioxide recovery system in fluid flow communication with said first column system for recovering carbon dioxide from said overhead vapor from said first column system to produce "light" impurity-rich residual gas and recovered carbon dioxide, wherein said second heat exchanger is arranged to at least partially condense carbon dioxide-enriched overhead vapor from said second column system by said indirect heat exchange against said vaporizing expanded "heavy" impurity-enriched liquid.

The first column system is for removal (or "rejection") of the "light" impurities from the crude carbon dioxide and thus may be referred to as a "lights" removal (or rejection) column system. The first column system usually comprises one or more distillation column systems for removing (or rejecting) one or more "light" impurity. Where the crude carbon dioxide comprises two or more "light" impurities having different volatilities relative to each other, the first column system may comprise a first distillation column system for removing (or rejecting) at least a first "light" impurity, e.g. helium, and a second distillation column system for removing (or rejecting) at least a second "light" impurity, e.g. nitrogen.

The second column system is for removal of the "heavy" impurities from the "light" impurity depleted carbon dioxide produced in the first column system and thus may be referred to as a "heavies" removal column system.

One advantage of preferred embodiments of the present invention is that overall energy consumption is reduced significantly. The reduction is achieved because the purity of the working fluid in the heat pump cycle is increased thereby enabling the recycle stream to condense over a narrower range of temperature which allows a closer average temperature approach when re-boiling the second column system. The recycle pressure can be reduced which enables a reduction in compression power required in the heat pump cycle.

A further advantage of preferred embodiments is that the overall recovery of carbon dioxide is improved significantly. The improvement is achieved as it is no longer necessary to purge working fluid from the heat pump cycle to prevent build up of "light" impurities. In addition, carbon dioxide is recovered from the overhead from the first column system.

In addition, since external refrigeration is not required, preferred embodiments are simpler and more efficient.

DETAILED DESCRIPTION OF THE INVENTION

Figure 1A:
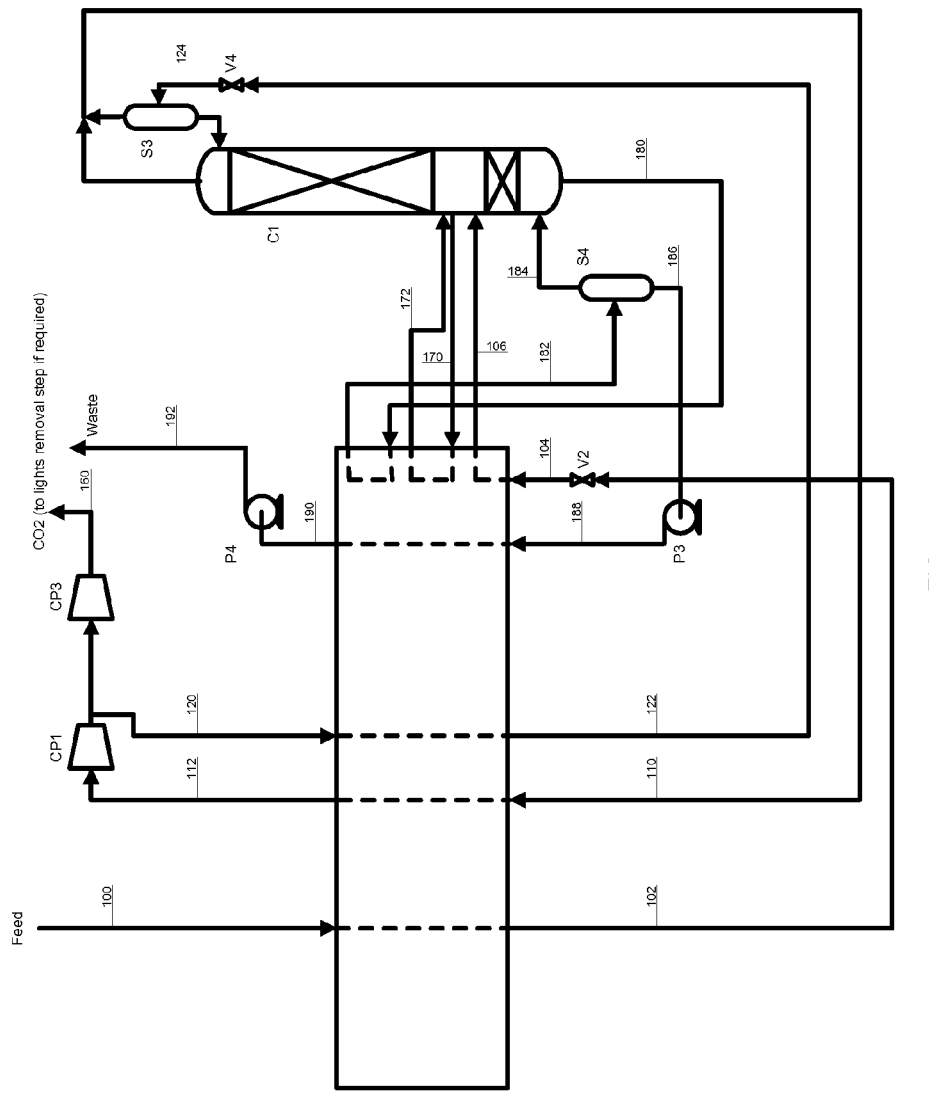
FIG. 1A is a flow sheet depicting a comparative process for purifying crude carbon dioxide in which the "heavy" impurities are removed by mass transfer separation in a single column involving a heat pump at a single pressure.

All references herein to pressure are references to absolute pressure and not gauge pressure unless expressly stated otherwise. In addition, references to "light impurity" and "heavy impurity" should be interpreted as references to "light impurities" and "heavy impurities" as appropriate depending on the number of such impurities present in the crude carbon dioxide fluid. Further, unless expressly stated otherwise, fluid compositions are calculated in mol. % on a "dry" basis, i.e. excluding any water content from the calculations. In reality, to avoid operating problems, water content must be low enough to avoid freeze-out and/or hydrate formation, i.e. the crude carbon dioxide should have a water content of no more than 10 ppm.

Overview of the Process

The present invention involves a process for purifying crude carbon dioxide fluid comprising at least one "light" impurity and at least one "heavy" impurity.

The process comprising cooling the crude carbon dioxide fluid above the triple point pressure of carbon dioxide by indirect heat exchange to produce cooled crude carbon dioxide fluid. The cooled crude carbon dioxide fluid is fed to a first column system for mass transfer separation to produce "light" impurity-enriched overhead vapor and "light" impurity-depleted carbon dioxide bottoms liquid comprising the "heavy" impurity. The first column system is re-boiled by indirect heat exchange to provide vapor for the first column system. The bottoms liquid is fed from the first column system to a second column system for mass transfer separation to produce carbon dioxide overhead vapor and bottoms liquid enriched with the "heavy" impurity. Reflux for the second column system is provided using a carbon dioxide-enriched liquid and the second column system is re-boiled by indirect heat exchange to provide vapor for the second column system.

The first and second column systems operate above the triple point pressure of carbon dioxide, i.e. above about 5.2 bar, and below the critical pressure of carbon dioxide, i.e. below about 73.9 bar.

The process comprises at least one heat pump cycle using as working fluid carbon dioxide-containing fluid from the second column system. The second column system is reboiled by at least partially vaporizing at least one "heavy" impurity-enriched liquid in or taken from the second column system, by indirect heat exchange against carbon dioxide-containing vapor from the second column system. The "heavy" impurity-enriched liquid may be "heavy" impurity-enriched bottoms liquid, at least one "heavy" impurity-enriched liquid in or taken from an intermediate location in the second column system, or a combination of such liquids. In preferred embodiments, the second column system is reboiled in part by vaporizing an "heavy" impurity-enriched intermediate liquid by indirect heat exchange against the carbon dioxide-containing vapor. "Heavy" impurity-enriched bottoms liquid is also vaporized by indirect heat exchange, possibly against another "warm" process stream, to provide further vapor for the second column system.

The overhead vapor from the first column system comprises carbon dioxide, at least a portion of which is recovered from the overhead vapor to produce "light" impurity-rich residual gas and recovered carbon dioxide. Depending on the recovery process and hence the temperature and pressure conditions of the recovered carbon dioxide, the recovered carbon dioxide may be either recycled to an appropriate point in the process, or fed to the second column system for mass transfer separation.

By "mass transfer separation", the Inventors mean processes involving distillation (or rectification or fractionation), scrubbing, stripping or washing. The expression is intended to include processes in which heat is also transferred. Typically, mass transfer separation in the first and second column systems is by distillation.

The skilled person would appreciate that, under normal operating conditions, the process is balanced and products of the mass transfer separations involved in the present invention are removed from the column systems effecting the separations to prevent unwanted build-up. The skilled person would appreciate that, under such conditions, the column systems typically contain an inventory of liquid.

By "re-boiling", the Inventors mean that liquid present in a column system is vaporized, typically by indirect heat exchange against a warmer process stream, to produce vapor for the column system and facilitate the mass transfer separation. Bottoms liquid and/or liquid from an intermediate point in the column system may be re-boiled. The liquid may be re-boiled within the column using an in situ re-boiler, or may be re-boiled outside the column, for example using a side re-boiler which may be a discrete unit, or may be a zone in a larger heat exchange unit.

Crude Carbon Dioxide Fluid

The crude carbon dioxide fluid may be taken from any suitable source. In some embodiments, the crude carbon dioxide fluid is derived from a natural source of carbon dioxide. In other embodiments, the crude carbon dioxide fluid may originate from enhanced oil recovery (EOR) processes.

In general, crude carbon dioxide from the field will often be reduced in pressure or temperature to "knock out" water, dissolved sulfur compounds and heavier hydrocarbons. For example, in EOR applications in particular, crude carbon dioxide would typically be reduced to low pressure, e.g. less than 5 bar. In such case, the crude carbon dioxide would be recompressed prior to processing using the present invention.

In addition, the concentration of water in the crude carbon dioxide may be further reduced to reduce the potential for condensation or hydrate formation within the present invention. The dehydration step could be performed with an adsorption system or a solvent-based system, for example using a glycol mixture as a solvent.

The pressure of the crude carbon dioxide fluid is typically above the triple point pressure for carbon dioxide (i.e. about 5.2 bar) and usually no more than 200 bar. Since the critical pressure of carbon dioxide is about 73.9 bar, the crude carbon dioxide fluid may be below, at or above the critical pressure for carbon dioxide. In some embodiments, the pressure of the crude carbon dioxide fluid is from about 100 bar to about 200 bar. In other embodiments, the pressure of the crude carbon dioxide fluid is from about 20 bar to about 100 bar, e.g. from about 30 bar to about 80 bar.

The temperature of the crude carbon dioxide fluid is typically no less than −20° C., usually no less than −10° C., and preferably no less than 0° C. The temperature may be above the critical temperature for carbon dioxide, i.e. about 31.1° C. However, the temperature of the crude carbon dioxide fluid is typically no more than 100° C., usually no more than 50° C. and preferably no more than 30° C. In some embodiments, the temperature is no more than 20° C., or even no more than 15° C. The temperature may be about the "bubble point" of carbon dioxide, i.e. the temperature at which the carbon dioxide begins to boil at a given pressure. In other embodiments, the temperature is at or above the dew point of carbon dioxide.

The present invention is intended to process crude carbon dioxide fluid at flow rates typically from about 50 to about 100,000 kmol/h (or 1 to 2000 million standard cubic feet per day or MMSCFD), e.g. about 500 to about 50,000 kmol/h (or 10 to 1000 MMSCFD). Individual plants would process typically about 2,500 to about 10,000 kmol/h (or 50 to 200 MMSCFD) but multiple plants may be used in parallel.

The crude carbon dioxide fluid typically comprises at least 50 mol. %, e.g. at least 65 mol. % and preferably at least 80 mol. % carbon dioxide. The crude carbon dioxide fluid typically comprises no more than 97 mol. %, e.g. no more than 95 mol. %, carbon dioxide. In preferred embodiments, the crude carbon dioxide comprises from about 85 mol. % to about 95 mol. % carbon dioxide.

Typical "heavy" impurities include hydrogen sulfide; methanol; C3 to C8 hydrocarbons such as propane; carbon disulfide; carbon oxysulfide; dimethyl sulfide and other organic sulfur compounds; nitrogen dioxide; sulfur dioxide; sulfur trioxide; and ammonia, and the present invention may be applied to the removal of any one, or any mixture, of these impurities or other "heavy" impurities. The total concentration of the "heavy" impurities in the crude carbon dioxide fluid is typically no more than 50 mol. %, for example no more than 25 mol %, e.g. no more than 10 mol. %. The total concentration of the "heavy" impurities in the crude carbon dioxide fluid is typically at least 0.1 mol. %, for example at least 0.2 mol. %, e.g. at least 0.5 mol. % or 1 mol. %.

The invention has particular application in the removal of hydrogen sulfide as a "heavy" impurity. The concentration of hydrogen sulfide may be from about 0.1 mol. to about 25 mol. %, e.g. from about 0.2 mol. % to about 10 mol. %.

Typical "light" impurities include nitrogen; oxygen; neon; krypton; argon; xenon; hydrogen; helium; methane; C2 hydrocarbons such as ethane; carbon monoxide; nitric oxide; and nitrous oxide, and the present invention may be applied to the removal of any one or any mixture of these impurities or other "light" impurities. The total concentration of the "light" impurities in the crude carbon dioxide fluid is typically no more than 50 mol. %, for example no more than 25 mol %, e.g. no more than 10 mol. %. The total concentration of the "light" impurities in the crude carbon dioxide fluid is typically at least 0.1 mol. %, for example at least 0.2 mol. %, e.g. at least 0.5 mol. % or 1 mol. %.

As indicated above, the present invention has particular application in the removal of hydrogen sulfide as a "heavy" impurity. In such cases, the "light" impurities are typically one or more of nitrogen, argon, helium, methane and ethane. The total concentration of "light" impurities in such cases may be from about 0.5 mol. % to about 50 mol. %, e.g. from about 1 mol. % to about 25 mol. %.

In embodiments where the crude carbon dioxide fluid is gaseous and at a sub-critical pressure, the fluid is typically condensed on cooling. In embodiments where the crude carbon dioxide fluid is supercritical, the fluid is "pseudo-condensed" on cooling. Typically, the crude carbon dioxide fluid is cooled to a temperature in the range from about 0° C. to about −55° C.

The cooled crude carbon dioxide fluid is usually expanded prior to being fed to the first column system. Prior to expansion, the cooled crude carbon dioxide fluid may be below, at or above the critical pressure for carbon dioxide. However, after expansion, the pressure of the fluid is sub-critical.

After cooling and optional pressure reduction, the feed to the first column system is typically two phase with the liquid phase containing predominantly carbon dioxide and heavy impurity and the vapor phase containing predominantly "light" impurities. In embodiments where there is only a small amount of "light" impurities in the crude carbon dioxide fluid, then the feed is predominantly liquid.

Removal of "Light" Impurities

The "light" impurities are removed from the crude carbon dioxide fluid by mass transfer separation in the first column system. The operating pressure(s) of the first column system is typically from about 10 bar to about 60 bar, e.g. from about 30 bar to about 60 bar, and operating temperature(s) is typically from about −55° C. to about 25° C.

The or each "light" impurity may be removed in a single step. In such cases, the first column system typically comprises a single distillation column system to which the cooled crude carbon dioxide fluid is fed for mass transfer separation to produce the "light" impurity-enriched overhead vapor and the "light" impurity-depleted carbon dioxide bottoms liquid.

In some cases where there is more than one "light" impurity, one of the light impurities may be more valuable than the other(s). In which case, it may be desirable to recover the more valuable "light" impurity separately from the other "light" impurities. Examples of such cases would include situations where the "light" impurities include hydrogen or helium which are more volatile (and potentially more valuable) than other "light" impurities such as nitrogen, oxygen, argon and methane.

In cases where the crude carbon dioxide fluid comprises a first "light" impurity and a second "light" impurity, the first "light" impurity being more volatile than said second "light" impurity, then the process may comprise different steps for removing the "light" impurities. Thus, the first column system may comprise a plurality of distillation column systems, for example a first distillation column system and a second distillation column system. In such cases, the process may comprise feeding the cooled crude carbon dioxide fluid to the first distillation column system to produce overhead vapor enriched in the first "light" impurity, and bottoms liquid depleted in the first "light" impurity; re-boiling the first distillation column system by indirect heat exchange to provide vapor for the first distillation column system; feeding bottoms liquid from the first distillation column system to the second distillation column system to produce the "light" impurity-enriched overhead vapor and the "light" impurity depleted carbon dioxide bottoms liquid; and feeding bottoms liquid from the second distillation column system to the first distillation column system, preferably as reflux.

The bottoms liquid from the first distillation column system is typically expanded prior to being fed to the second distillation column system.

The bottoms liquid from the second distillation column system is preferably pumped prior to being fed to the first distillation column system.

Additionally or alternatively, reflux for the first distillation column system may be provided using carbon dioxide-enriched liquid from the second column system. In these embodiments, the bottoms liquid from the second distillation column system may be fed to an intermediate location in the first distillation column system. The carbon dioxide-enriched liquid from the second column system is preferably pumped prior to being fed as reflux to the first distillation column system.

The first and second distillation column systems both operate within the broad range of pressures and temperatures identified above. However, in preferred embodiments, the first distillation column system operates at a pressure of about 40 bar to about 60 bar and a feed temperature from about −55° C. to about 10° C., and the second distillation column system operates at a pressure of about 30 bar to about 50 bar and a feed temperature from about −30° C. to about 10° C.

In other embodiments where the crude carbon dioxide fluid comprises methane as a "light" impurity, the first column system recovers methane in a methane-enriched overhead vapor. If nitrogen is also present as a "light" impurity, then the methane-enriched overhead vapor also contains nitrogen and the overhead vapor may then be subjected to a nitrogen rejection process to recover the methane.

In further embodiments where the "light" impurities are methane, nitrogen and helium, it would be possible to reject a mixture of the light impurities, then apply conventional processes for the rejection of nitrogen and recovery of helium.

The crude carbon dioxide fluid is typically a vapor that is at least partially condensed during the initial cooling step to produce the cooled crude carbon dioxide fluid which is preferably expanded prior to being fed to the first column system. In such embodiments, re-boiling duty for the first column system is usually provided at least in part by indirect heat exchange against condensing crude carbon dioxide fluid. However, the re-boiling duty may be provided at least in part by indirect heat exchange against condensing recycle fluid in the heat pump cycle.

Recovery of Carbon Dioxide

Overhead vapor from the first column system contains carbon dioxide. The Inventors propose recovering carbon dioxide from this vapor to improve overall carbon dioxide recovery.

The temperature of the overhead vapor from the first column system when fed to the carbon dioxide recovery step depends on the nature of the recovery process. The temperature of the overhead vapor may be reduced or increased or even remain unchanged after the overhead vapor is removed from the first column system. In preferred embodiments, the overhead vapor is cooled to condense carbon dioxide to facilitate separation from the "light" impurities which would remain uncondensed. This is referred to herein as "cold" recovery of carbon dioxide.

The refrigeration duty required to cool and partially condense the overhead vapor from the first column system may provided by indirect heat exchange against any suitable process stream, for example evaporating recovered carbon dioxide after expansion. Alternatively, the refrigeration duty may be provided by a combination of indirect heat exchange against a process stream and direct heat exchange with a colder washing liquid in a wash column.

In some embodiments, carbon dioxide is recovered from the overhead vapor by partial condensation and phase separation. In such embodiments, the overhead vapor from the first column system is cooled by indirect heat exchange to condense carbon dioxide in the vapor which is then recovered by phase separation.

In other embodiments, the overhead vapor from the first column system is cooled by indirect heat exchange to condense carbon dioxide and the partially condensed fluid is fed to a wash column in which "heavy" impurities are washed out of the uncondensed vapor. Carbon dioxide-enriched liquid from the second column system is used to wash the uncondensed vapor in the wash column. The overhead vapor from the first column system may be cooled further by direct heat exchange with the washing liquid in the wash column.

The liquid/vapor ("L/V") ratio in the wash column is typically low in order to wash the small quantity of "heavy" impurities out of the "light" impurity-enriched vapor. The L/V ratio is typically less than 1, e.g. less than 0.5 or even less than 0.2.

In embodiments such as these involving "cold" recovery of carbon dioxide, recovery typically takes place at a pressure that is as high as possible and/or practicable within the process, and at a temperature that is as low as possible and/or practicable within the process so as to maximize the recovery of carbon dioxide. For example, the pressure is typically the same as the operating pressure of the part of the first column system from which the overhead vapor is taken (usually allowing for inherent pressure drop). The temperature is typically just above, e.g. a few degrees centigrade, or 1 to 3° C., above the temperature at which carbon dioxide would "freeze out" of the vapor.

In further embodiments, carbon dioxide may recovered from the overhead vapor from the first column system using a process selected from the group consisting of adsorption; absorption; membrane separation; and solidification and separation at a temperature below the triple point temperature for carbon dioxide.

Suitable adsorption processes include Temperature Swing Adsorption (TSA), Vacuum Swing Adsorption (VSA) and Pressure Swing Adsorption (PSA). Suitable absorption processes include amine-based systems or other chemical or physical solvent systems. Examples of suitable absorption processes include Selexol® and Rectisol®. In these embodiments, the recovered carbon dioxide may be sufficiently pure to be combined directly to the product rather than being fed to the first column system.

In membrane separation processes, carbon dioxide permeates the membranes and may be recompressed and fed to the second column system or recycled upstream of the "light" impurity removal step. Suitable membrane systems include polymeric membranes such as PRISM® membranes (Air Products and Chemicals, Inc.).

Where carbon dioxide is recovered by solidification, the solid carbon dioxide is separated by any suitable means from the residual gas at a temperature below the triple point temperature for carbon dioxide. The invention covers the use of a supersonic separator and hydrate separator supplied by Twister BV in this context.

In some embodiments, the "light" impurity-rich residual gas is warmed by indirect heat exchange and purged from the process. Alternatively, if the purity specification of the carbon dioxide product allows, at least a portion of the "light" impurity-rich gas may warmed by indirect heat exchange and added to carbon dioxide gas removed as product from the second column system. In this way, the purity of the carbon dioxide recycle stream(s) in the heat pump cycle(s) may be increased so that the streams condense over a narrower temperature range, thereby enabling a better match of the boiling temperature profile of the reboiler of the second column system.

In embodiments where the "light" impurity is combustible, e.g. selected from the group consisting of hydrogen; methane; C2 hydrocarbons; carbon monoxide and mixtures thereof, the "light" impurity-rich residual gas may be used as a fuel for combustion to produce combustion product gas. In such embodiments, heat is preferably recovered from the combustion product gas by indirect heat exchange.

In some embodiments involving "cold" recovery of carbon dioxide, the recovered carbon dioxide is typically fed as a supplementary feed to the second column system for mass transfer separation. The recovered liquid is optionally heated by indirect heat exchange (so to avoid formation of solid carbon dioxide on expansion), expanded and vaporized by indirect heat exchange, prior to being fed to the second column system. In some embodiments, the recovered carbon dioxide is flashed in a separator vessel prior to (optional heating and) expansion, the vapor phase typically being warmed by indirect heat exchange and purged from the process and the liquid phase being expanded, vaporized and fed to the second column system.

Alternatively, at least a portion of the recovered carbon dioxide may be recycled to the process. For example, if very pure carbon dioxide is required, the recovered carbon dioxide may either be recycled upstream of the "light" impurity separation step, or fed as reflux to the first column system, as the "light" impurities in this stream would otherwise contaminate the pure carbon dioxide product.

In other embodiments, there may be "warm" recovery of carbon dioxide. For example, the overhead vapor from the first column system may be warmed by indirect heat exchange and carbon dioxide may be recovered from the warmed stream using a membrane separation system and recycled.

Removal of "Heavy" Impurities

Carbon dioxide bottoms liquid from the first column system still comprises the or each "heavy" impurity but is typically at least substantially free of "light" impurities, e.g. contains less than 5 mol. %, and typically less than 1 mol %, "light" impurities depending on the final carbon dioxide purity requirement. The liquid is fed to the second column system for mass transfer separation to produce carbon dioxide overhead vapor and bottoms liquid enriched with the "heavy" impurity.

In some preferred embodiments, the bottoms liquid from the first column system is subcooled prior to being fed to the second column system.

In other preferred embodiments, the bottoms liquid from the first column system is expanded prior to being fed to the second column system. In these embodiments, the bottoms liquid from the first column system may be subcooled by indirect heat exchange prior to being expanded.

In further preferred embodiments, the bottoms liquid from the first column system is at least partially vaporized prior to being fed to the second column system. In these embodiments, the bottoms liquid from the first column system may be subcooled by indirect heat exchange and optionally expanded prior to being at least partially vaporized. Alternatively, the bottoms liquid from the first column system may be expanded (without subcooling) prior to being at least partially vaporized.

The operating pressure(s) of the second column system is typically at least 10 bar. This avoids having to operate the column system at a temperature that is excessively cold and means that the volumetric suction flow of the heat pump compressor is not excessive.

The operating pressure(s) of the second column system is typically no more than about 40 bar, e.g. no more than about 30 bar. In preferred embodiments, the operating pressure(s) is no more than about 25 bar. At this pressure, the second column system operates sufficiently far from the critical pressure for the hydraulic parameters within the column to be comfortable.

The temperature of the primary feed to the second column system is typically in the range from about −40° C. to about 5° C.

The second column system may comprise a single distillation column, a split distillation column where both parts of the column operate at the same pressure, or multiple distillation columns where the columns operate at different pressures. In the latter case, all of the operating pressures fall within the preferred ranges given above.

In embodiments in which the second column system comprises two distillation columns operating at different pressures, the operating pressure of the higher pressure column is typically from about 15 bar to about 40 bar and the operating pressure of the lower pressure column is typically from about 10 bar to about 30 bar.

The bottoms liquid from the first column system is preferably fed to an intermediate location in the second column system. The second column system typically contains distillation trays and/or packing (random and/or structured), together with liquid re-distributors etc., to increase vapor/liquid and thereby improve mass transfer separation. In such embodiments, the second column system typically comprises at least two distillation sections with an intermediate zone between adjacent distillation sections. This intermediate zone is typically the feed location for the bottoms liquid from the first column system to the second column system.

By "adjacent distillation sections", the Inventors mean that there is no other distillation section between them. The "adjacent" distillation sections may be within the same distillation column system, e.g. in a single distillation column system, or may be in different distillation column systems, e.g. in a split or multiple distillation column system. The adjacent distillation sections may be in vertically and/or laterally spaced apart relation. Where the adjacent distillation sections are in laterally spaced apart relation, it may be necessary to pump liquid from one distillation section to the other, depending on the position of the distillation sections relative to each other.

The second column system is typically re-boiled by at least partially vaporizing liquid in or taken from an intermediate location in the second column system. The intermediate liquid may be in or taken from the same intermediate zone as the feed location, or may be in or taken from a different intermediate zone in the second column system below said feed location, i.e. with at least one distillation section there between.

In addition, the second column system is typically re-boiled by at least partially vaporizing bottoms liquid produced in the second column system. The reboiler may be in the sump of the column system, or may be located outside the column.

The second column system may also comprise at least one vapor/liquid separator; one separator to separate a vapor component from reflux liquid for the column system; and/or a different separator to separate a liquid component from vapor for the column system generated from partially re-boiled liquid taken from the column system.

Carbon dioxide-enriched overhead vapor has a greater concentration of carbon dioxide than the crude carbon dioxide fluid. The concentration of carbon dioxide in the overhead vapor is typically at least 90 mol. %, e.g. at least 95 mol. % and preferably at least 98 mol. %. The overhead vapor is preferably substantially pure carbon dioxide containing no more than 200 ppm, preferably no more than 100 ppm, of "heavy" impurities.

The bottoms liquid produced in the second column system comprises at least substantially all, and preferably essentially all, of any "heavy" impurity present in the crude carbon dioxide fluid. In preferred embodiments, the vapor flow in the bottom section of the distillation column system is reduced resulting in a reduction in the diameter of the bottom section of the column system. The total inventory of bottoms liquid is thereby reduced significantly where there is a higher concentration of the volatile impurities. A reduction in the amount of liquid inventory means that there is less liquid inventory to escape in the event of a catastrophic failure of the plant. This advantage is particularly important where the "heavy" impurity or, where there is more than one, at least one of the "heavy" impurities is toxic, for example, in cases where the impurity is hydrogen sulfide.

The process also provides carbon dioxide-enriched liquid for use as reflux for the second column system, and a portion of the bottoms liquid is at least partially re-boiled by indirect heat exchange to provide vapor for the column system. Carbon dioxide-enriched overhead vapor is removed from the column system, as is a portion of the bottoms liquid, or a liquid derived from bottoms liquid.

Heat Pump Cycle(s)

Re-boiling duty for at least the second column system is provided at least in part by indirect heat exchange against recycle fluid(s) from at least one heat pump cycle using a carbon dioxide-containing vapor originating from the second column system as working fluid. Where there is more than one recycle fluid, at least one of the recycle fluids may a different pressure from the other recycle fluid(s).

By "heat pump cycle", the Inventors are referring to a cycle by which thermal energy is transferred from a heat source, which is at lower temperature, to a heat sink, which is at higher temperature. The heat pump cycle uses a working fluid which in this case is a carbon dioxide vapor from the second column system.

Typically, the working fluid is removed from the second column system; at least partially vaporized (optional); warmed; compressed; and recycled to the column system after suitable cooling (and optional at least partially condensation) and pressure reduction. The compressed fluid, or "recycle fluid", is used to provide re-boil duty by indirect heat exchange with "heavy" impurity-enriched liquid(s) in or taken from the second column system, typically "heavy" impurity-enriched intermediate liquid(s). The recycle fluid(s) are cooled to a certain extent as a result of providing the re-boil duty but typically require further cooling before being returned to the second column system.

In preferred embodiments, the heat source is the overhead vapor that typically condenses at a lower temperature than the re-boiler (the heat sink). However, the Inventors have observed that, by compressing the overhead vapor in the heat pump cycle, the vapor transfers heat to the re-boiler and is condensed at a higher temperature than the reboiler.

In some embodiments, the working fluid is carbon dioxide depleted in "heavy" impurity and typically selected from the group consisting of carbon dioxide-enriched overhead vapor or carbon dioxide-enriched vapor taken from an intermediate location in the second column system ("intermediate vapor"). In preferred embodiments, overhead vapor is used as the working fluid.

The present invention may involve at least two recycle fluids at different pressures. In such cases, the pressure differential is significant, typically of the order of at least 10%, e.g. at least 25% or even at least 50%, although the pressure differential is usually no more than 200%, e.g. no more than 100%. In absolute terms, the pressure differential may be at least 2 bar, e.g. at least 5 bar and preferably at least 10 bar. The pressure differential is usually no more than 50 bar and preferably no more than 30 bar.

In some preferred embodiments, the process comprises a single heat pump cycle having one or more recycle fluids. Where there is one recycle fluid, the pressure of that fluid is typically from about 15 bar to about 60 bar.

Where there is more than one recycle fluid, the process may comprise a first recycle fluid and a second recycle fluid, the second recycle fluid having a pressure that is greater than that of the first recycle fluid. The pressure of the first recycle fluid is typically from about 15 bar to about 30 bar. The pressure of the second recycle fluid is typically about 20 bar to about 70 bar.

In some embodiments, the working fluid of the heat pump cycle comprises carbon dioxide-enriched gas generated by warming the carbon dioxide-enriched overhead vapor by indirect heat exchange. At least a portion of the duty required to warm the carbon dioxide-enriched overhead vapor may be provided by indirect heat exchange against any suitable "warm" process stream but is preferably provided by indirect heat exchange against at least one of the recycle fluids. The compressor feed may be warmed against the compressor products so that the flows on both sides of the heat exchanger are the same. In these embodiments, both the first and second recycle fluids are used to warm the overhead vapor.

The recycle fluid(s) are typically recycled to an appropriate location in the second column system after suitable pressure reduction. The appropriate location in the second column system is typically where the composition in the column matches the composition of the recycle fluids. Where the working fluid is carbon dioxide overhead vapor, condensed recycle fluid is typically recycled as reflux to the second column system.

The ratio of molar flow of the first recycle fluid to the second recycle fluid is determined by the duty required of the fluids. Typically, the molar flow ratio is from about 0.1 (i.e. 1:10) to about 15 (i.e. 15:1). In some preferred embodiments, this ratio is from about 3 (i.e. 3:1) to about 12 (i.e. 12:1). In other preferred embodiments, the ratio is from about 0.2 (i.e. 1:5) to about 1 (i.e. 1:1).

In other embodiments, the working fluid of the heat pump cycle comprises "heavy" impurity-enriched gas generated by vaporizing liquid taken from said second column system by indirect heat exchange after suitable pressure reduction. The liquid is an "heavy" impurity-enriched liquid taken from an intermediate location in the second column system or the bottom of said column system. In preferred embodiments, the intermediate liquid is removed from a location that is at least substantially level (or below) with the location of the main feed to the second column system. In such embodiments, the composition of the intermediate liquid is usually at least substantially identical to that of the carbon dioxide feed to the second column system. In these embodiments, the working fluid may also comprise carbon dioxide gas generated by warming the carbon dioxide overhead vapor by indirect heat exchange.

At least a portion of the duty required to evaporate said "intermediate" liquid may also be provided by any suitable "warm" process stream. Preferably, the intermediate liquid is evaporated by indirect heat exchange against condensing overhead vapor from the second column system.

In these other embodiments, the first recycle fluid is preferably recycled as part of the feed to the second column system and, additionally or alternatively, the second recycle fluid is preferably recycled as part of the working fluid for the heat pump cycle after suitable pressure reduction.

The process may comprise at least a first heat pump cycle and a second heat pump cycle, each heat pump cycle comprising at least one recycle fluid. In these embodiments, the recycle fluid of the first heat pump cycle or, where the first heat pump cycle has more than one recycle fluid, at least one of the recycle fluids, has a pressure that is greater than that of a recycle fluid of the second heat pump cycle.

The working fluid of the first heat pump cycle preferably comprises carbon dioxide-enriched gas generated by warming the carbon dioxide-enriched overhead vapor by indirect heat exchange. At least a portion of the duty required to warm the carbon dioxide-enriched overhead vapor may be provided by indirect heat exchange against any suitable "warm" process stream although, in preferred embodiments, it is provided by indirect heat exchange against at least one of the recycle fluids. The pressure of the recycle fluid of the first heat pump cycle is typically from about 15 bar to about 60 bar.

The working fluid of the second heat pump cycle may comprises carbon dioxide-enriched gas generated by warming "intermediate" vapor taken from an intermediate location of the distillation column system by indirect heat exchange. The "intermediate" vapor is a carbon dioxide-enriched fluid. In preferred embodiments, the intermediate vapor is removed from a location that is at least substantially level with the location of the main feed to the column system. In such embodiments, the composition of the intermediate vapor is usually at least substantially identical to that of the carbon dioxide feed.

At least a portion of the duty required to warm the "intermediate" vapor may be provided by indirect heat exchange against any suitable "warm" process stream although, in preferred embodiments, it is provided by indirect heat exchange against at least one of the recycle fluids.

As in the other embodiments, the recycle streams are usually recycled to appropriate locations in the second column system after suitable pressure reduction if required. In this connection, the first recycle fluid is preferably condensed and recycled after pressure reduction to the top of the second column system to provide reflux. The second recycle fluid is usually recycled after suitable pressure reduction if required to an intermediate location in the second column system that is at least substantially level with the location of the main feed to the column system. In preferred embodiments in which the column system comprises a dual column arrangement, the working fluid for the second heat pump cycle is intermediate vapor from the lower pressure column and is recycled without pressure reduction to the bottom of the higher pressure column.

The pressure of the recycle fluid of the second heat pump cycle is preferably from about 10 bar to about 25 bar, e.g. the operating pressure of the part of the second column system to which the recycle fluid is recycled.

Re-Boiling Duty for the Second Column System

Bottoms liquid alone, or both bottoms liquid and at least one liquid from an intermediate location in the second column system (or "intermediate liquid") is preferably at least partially re-boiled by indirect heat exchange to provide vapor for the second column system. At least a portion of the re-boiling duty, particularly for intermediate liquid(s), may be provided by indirect heat exchange against any suitable "warm" process stream although, in preferred embodiments, it is provided by indirect heat exchange against at least one of the recycle fluids, e.g. the first recycle fluid which is at least partially condensed as a result.

In embodiments in which the heat pump has a single recycle stream, an advantage of using the intermediate reboiler is that the pressure to which the working fluid must be compressed is reduced thereby saving power. In embodiments in which the heat pump has more than one recycle stream, or where there is more than one heat pump cycle, an advantage of using an intermediate re-boiler is that the power consumption is significantly reduced by only needing to compress a fraction (typically <10%) of the overhead vapor to the higher pressure required to heat the bottom re-boiler, whilst the rest only needs to be compressed to the lower pressure.

A further advantage of the intermediate re-boiler for all embodiments is that the column diameter below the reboiler, where the hydrogen sulfide concentration increases rapidly, can be significantly reduced so that the inventory of highly toxic hydrogen sulfide can be reduced.

In some preferred embodiments, the reflux for the second column system is preferably provided by at least one recycle fluid condensate, typically condensed overhead vapor, after suitable pressure reduction. In other embodiments, the reflux for the column is provided by an overhead condenser arrangement in which overhead vapor is at least partially condensed by indirect heat exchange against at least one "cold" process stream, e.g. re-boiling intermediate or bottoms liquid, and returned to the column system.

Refrigeration Duty

The refrigeration duty required to cool and at least partially condense at least one recycle fluid may be provided by indirect heat exchange against any suitable "cold" process stream.

By "refrigeration duty", the Inventors mean the cooling duty and, if applicable, the condensing duty required by the process.

By "cold process stream", the Inventors mean any fluid stream within the process whose temperature is lower than that of the fluid to be cooled and, where appropriate, condensed and whose pressure is suitable to provide the necessary indirect heat exchange. Suitable "cold" process streams include streams entering a main heat exchange at the cold end. In preferred embodiments, the duty is provided by indirect heat exchange against at least one fluid selected from the group consisting of carbon dioxide-enriched liquid; intermediate liquid; bottoms liquid; liquid derived from bottoms liquid; and expanded crude carbon dioxide fluid.

The crude carbon dioxide fluid is cooled by indirect heat exchange prior to separation. At least a portion of the refrigeration duty required to cool and optionally condense the crude carbon dioxide fluid may be provided by indirect heat exchange with any suitable refrigerant stream although, in preferred embodiments, it is provided by indirect heat exchange against at least one "cold" process stream selected from the group consisting of carbon dioxide-enriched liquid; intermediate liquid; bottoms liquid from any column system; liquid derived from bottoms liquid; and expanded crude carbon dioxide fluid.

The "light" impurity-depleted carbon dioxide bottoms liquid from the first column system is preferably used as a "cold" process stream to provide refrigeration duty for the process. Alternatively, the liquid may also be used as a "warm" process stream since it is typically subcooled by indirect heat exchange. The subcooled stream is typically expanded and then can be used as a "cold" stream when vaporized by indirect heat exchange. The liquid may also be fed directly to the distillation column stream without providing refrigeration duty by indirect heat exchange.

The feed may be derived from supercritical crude carbon dioxide fluid and carbon dioxide liquid is produced as a product. In these embodiments, the carbon dioxide liquid is typically removed from the second column system, pumped and warmed by indirect heat exchange to produce warmed carbon dioxide liquid as a product. At least a portion of the duty required to warm the pumped carbon dioxide liquid may be provided by indirect heat exchange against any suitable "warm" process stream although, in preferred embodiments, it is provided by indirect heat exchange against at least one of the recycle fluids.

The pumped carbon dioxide liquid is preferably used as a "cold" process stream to provide refrigeration duty for the process.

The feed may be derived from crude carbon dioxide vapor and carbon dioxide gas is produced as a product. In these embodiments, a portion of the carbon dioxide overhead vapor from the second column system is typically warmed by indirect heat exchange to produce the carbon dioxide gas. At least a portion of the duty required to warm said carbon dioxide overhead vapor may be provided by indirect heat exchange with any suitable "warm" process stream although, in preferred embodiments, it is provided by indirect heat exchange against at least one of the recycle fluids.

The carbon dioxide overhead vapor is preferably used as a "cold" process stream to provide refrigeration duty for the process.

A portion of bottoms liquid from the second column system, or liquid derived from said bottoms liquid, is usually pumped to provide "heavy" impurity-rich waste liquid. Since the pumped liquid is typically a small stream near ambient temperature, there may be no need to or advantage to warm it by indirect heat exchange, before disposal as a waste liquid. However, in embodiments in which the liquid is significantly below ambient temperature, the liquid may be used as a "cold" stream to provide refrigeration duty. At least a portion of the duty required to warm the pumped bottoms liquid may be provided by indirect heat exchange against any "warm" process stream although, in preferred embodiments, it is provided by indirect heat exchange against at least one of the recycle fluids.

The further portion of the bottoms liquid, or the liquid derived from bottoms liquid, is typically used as a "cold" process stream to provide refrigeration duty for the process.

An external refrigeration cycle may be used to provide at least a portion of the refrigeration duty required by the process, e.g. to cool the feed to the process thereby producing the cooled carbon dioxide fluid. However, in preferred embodiments, the entire process is auto-refrigerated, i.e. none of the refrigeration duty is provided by an external refrigeration cycle.

Apparatus

In one arrangement, the apparatus comprises:
- a first heat exchanger for cooling said crude carbon dioxide fluid by indirect heat exchange to produce cooled crude carbon dioxide fluid;
- a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;
- a second column system in fluid flow communication with said first column system for separating said bottoms liquid from said first column system by mass transfer separation to produce carbon dioxide-enriched overhead vapor and bottoms liquid enriched with said heavy impurity;
- a second heat exchanger in fluid flow communication with said second column system for warming carbon dioxide-enriched overhead vapor from said second column system by indirect heat exchange to produce warmed carbon dioxide-enriched gas;
- a first compressor in fluid flow communication with said second heat exchanger for compressing said warmed carbon dioxide-enriched gas to produce compressed carbon dioxide-enriched recycle gas;
- a third heat exchanger in fluid flow communication with said first compressor for cooling and at least partially condensing said compressed carbon dioxide-enriched recycle gas by indirect heat exchange to form at least partially condensed carbon dioxide-enriched liquid;
- a first pressure reduction arrangement in fluid flow communication with said third heat exchanger for expanding said at least partially condensed carbon dioxide-enriched liquid;
- a conduit arrangement for providing at least partially condensed carbon dioxide-enriched liquid from said first pressure reduction arrangement to said second column system as reflux; and
- a carbon dioxide recovery system in fluid flow communication with said first column system for recovering carbon dioxide from said overhead vapor from said first column system to produce "light" impurity-rich residual gas and recovered carbon dioxide, wherein said third heat exchanger is arranged to re-boil said second column system by vaporizing "heavy" impurity-enriched liquid in or taken from said second column system by said indirect heat exchange against said condensing carbon dioxide recycle gas.

In another arrangement, the apparatus comprises:
- a first heat exchanger for cooling said crude carbon dioxide fluid by indirect heat exchange to produce cooled crude carbon dioxide fluid;
- a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;
a second column system in fluid flow communication with said first column system for separating said bottoms liquid from said first column system by mass transfer separation to produce carbon dioxide-enriched overhead vapor and bottoms liquid enriched with said heavy impurity;
a first pressure reduction arrangement in fluid flow communication with said second column system for expanding "heavy" impurity-enriched liquid from said second column system to produce expanded "heavy" impurity-enriched liquid;
a second heat exchanger in fluid flow communication with said first pressure reduction arrangement for at least partially vaporizing said expanded "heavy" impurity-enriched liquid by indirect heat exchange to produce expanded "heavy" impurity-enriched gas;
a first compressor in fluid flow communication with said second heat exchanger for compressing said expanded "heavy" impurity-enriched gas to produce compressed "heavy" impurity-enriched recycle gas;
a third heat exchanger in fluid flow communication with said first compressor for cooling said compressed "heavy" impurity-enriched recycle gas by indirect heat exchange to form cooled "heavy" impurity-enriched recycle gas;
a conduit arrangement for feeding said cooled "heavy" impurity-enriched recycle gas from said third heat exchanger to said second column system; and
a carbon dioxide recovery system in fluid flow communication with said first column system for recovering carbon dioxide from said overhead vapor from said first column system to produce "light" impurity-rich residual gas and recovered carbon dioxide,
wherein said second heat exchanger is arranged to at least partially condense carbon dioxide-enriched overhead vapor from said second column system by said indirect heat exchange against said vaporizing expanded "heavy" impurity-enriched liquid.

By "fluid flow communication", the Inventors mean that the relevant parts of the apparatus are operationally arranged and/or interconnected such that fluid may flow between the parts as indicated. Fluid flow communication may be provided in any suitable way although the use of conduit arrangements, such as piping, is preferred. Fluid flow communication may also include, for example, pressure reduction arrangements, such as expansion valves; channels in a heat exchanger; and/or phase separation vessels, as required.

Typically, the apparatus comprises a conduit arrangement for feeding recovered carbon dioxide from the carbon dioxide recovery system to the second column system for mass transfer separation.

The apparatus preferably comprises a second pressure reduction arrangement, such as an expansion valve, provided in the fluid flow communication between the first heat exchanger and the first column system for expanding the cooled crude carbon dioxide fluid.

The apparatus preferably comprises a fourth heat exchanger provided in the fluid flow communication between the first column system and the carbon dioxide recovery system for cooling the overhead vapor from the first column system by indirect heat exchange.

In some embodiments, the carbon dioxide recovery system comprises:

a fifth heat exchanger in fluid flow communication with the first column system for partially condensing the overhead vapor from the first column system by indirect heat exchange; and
a phase separator in fluid flow communication with the fifth heat exchanger for separating the "light" impurity-rich residual gas from the recovered carbon dioxide in the form of condensate.

In other embodiments, the carbon dioxide recovery system comprises:

a wash column in fluid flow communication with the first column system for washing carbon dioxide and the "heavy" impurity from the overhead vapor from the first column system to produce the "light" impurity-rich residual gas and the recovered carbon dioxide; and
a conduit arrangement for feeding carbon dioxide-enriched liquid from the second column system to the wash column.

The second column system typically comprises:

at least two distillation sections;
an intermediate zone between adjacent distillation sections; and
an inlet for feeding bottoms liquid from the first column system to the second column system at the intermediate zone.

In such embodiments, the third heat exchanger is typically arranged to re-boil liquid in or taken from the intermediate zone of the second column system to which bottoms liquid from the first column system is fed, or another intermediate zone.

Preferably, the apparatus comprises a third pressure reduction arrangement, such as an expansion valve, in the fluid flow communication between the first heat exchanger and the first column system for expanding the crude carbon dioxide fluid.

The first re-boiler is preferably at least a part of the first heat exchanger, the first heat exchanger being arranged to re-boil the bottoms liquid produced by the first column system by the indirect heat exchange against the condensing crude carbon dioxide fluid.

Additionally or alternatively, the first re-boiler may be at least a part of the third heat exchanger, the third heat exchanger also being arranged to re-boil the bottoms liquid produced by the first column system by the indirect heat exchange against the condensing carbon dioxide fluid.

The first or second column system may comprise a distillation (or rectification or fractionation) column system, a scrubbing column system, a stripping column system or a wash column system. In preferred embodiments, the first or second column system comprises a distillation column system.

The first column system typically comprises at least one distillation column system. In such embodiments, the first column system may comprise:

a first distillation column system for separating crude carbon dioxide fluid into overhead vapor enriched in a first "light" impurity, and bottoms liquid depleted in said first "light" impurity;
a second re-boiler for re-boiling by indirect heat exchange bottoms liquid produced by the first distillation column system;
a second distillation column system in fluid flow communication with the first distillation column system for separating bottoms liquid from the first distillation column system into the "light" impurity-enriched overhead vapor and the "light" impurity-depleted carbon dioxide bottoms liquid; and a conduit arrangement for providing bottoms liquid from the second distillation column system to the first distillation column system, preferably as reflux, wherein the first re-boiler is arranged to re-boil the second distillation column system. In such embodiments, the conduit arrangement for providing bottoms liquid from the second distillation column system to the first distillation column system preferably comprises a first pump for pumping bottoms liquid from the second distillation column system to the first distillation column system.

The apparatus may also comprise a conduit arrangement for providing carbon dioxide-enriched liquid from the second column system as reflux to the first distillation column system. In such embodiments, the conduit arrangement for providing carbon dioxide-enriched liquid from the second column system as reflux to the first distillation column system may comprise a second pump for pumping carbon dioxide liquid from the second column system to the first distillation column system.

The apparatus preferably comprises a fourth pressure reduction arrangement, such as an expansion valve, in the fluid flow communication between the first and second distillation column systems for expanding said bottoms liquid from said first distillation column system prior to being fed to said second distillation column system.

The apparatus preferably comprises a sixth heat exchanger in the fluid flow communication between the first column system and the second column system for subcooling bottoms liquid from the first column system by indirect heat exchanger prior to feeding to the second column system.

The apparatus preferably comprises a fifth pressure reduction arrangement, such as an expansion valve, in the fluid flow communication between the first column system and the second column system for expanding bottoms liquid from the first column system prior to feeding to the second column system.

The apparatus preferably comprises a seventh heat exchanger in the fluid flow communication between the first column system and the second column system for at least partially vaporizing bottoms liquid from the first column system prior to feeding to the second column system.

In preferred embodiments, the second heat exchanger is in fluid flow communication with the top portion of the second column system, thereby enabling the use of carbon dioxide overhead vapor as the working fluid of the heat pump cycle.

The heat exchangers may be individual heat exchangers. However, in preferred embodiments, the heat exchangers are zones within at least one larger heat exchange unit. Preferably, the heat exchangers are zones within a single primary heat exchange unit which is typically a plate fin heat exchanger made of braized aluminum.

The compressors may be individual compressors. However, in some embodiments, the compressors may be stages within one or more multistage intercooled compressor.

The distillation column systems may also comprise at least one vapor/liquid separator to separate a vapor component from reflux liquid for the column system, and/or to separate a liquid component from vapor for the column system generated from partially re-boiled liquid taken from the column system.

The invention will now be further described with reference to the comparative process depicted in FIGS. 1A & 1B and preferred embodiments of the present invention depicted in FIGS. 2 to 11.

In the process depicted in FIG. 1A, a stream 100 of crude carbon dioxide vapor is cooled and condensed by indirect heat exchange in main heat exchanger HE1 by indirect heat exchange to produce a stream 102 of crude carbon dioxide condensate. Stream 102 is expanded across expansion valve V2 to produce stream 104 of expanded crude carbon dioxide condensate which is then vaporized by indirect heat exchange in main heat exchanger HE1 to form stream 106 of crude carbon dioxide vapor and fed to distillation column system C1 for removal of the "heavy" impurities.

Crude carbon dioxide is separated in a distillation column C1 into "heavy" impurity-depleted carbon dioxide overhead vapor and "heavy" impurity-enriched bottoms liquid. Reboil duty for the distillation column is provided at least in part by a recycle fluid in a heat pump cycle using overhead vapor as the working fluid. In this regard, overhead vapor is removed and fed as stream 110 to the main heat exchanger HE1 where it is warmed by indirect heat exchange to produce stream 112 which is compressed in compressor CP1 to produce compressed carbon dioxide gas. The compressed gas is divided into two portions. The first portion is further compressed in compressor CP3 and then fed to a downstream process, e.g. FIG. 1B, for removal of "light" impurities. The second portion is fed as recycle stream 120 to the main heat exchanger HE1 where it is cooled and partially condensed to form stream 122 of partially condensed carbon dioxide gas. Stream 122 is expanded across valve V4 to produce stream 124 which is phase separated in phase separator vessel S3. The separated vapor is combined with the overhead vapor from column C1 to form stream 110 and the separated liquid is returned to the top of the distillation column C1 as reflux.

A stream 180 of "heavy" impurity-enriched bottoms liquid is removed from the distillation column C1 and partially vaporized by indirect heat exchange in the main heat exchanger HE1 against condensing feed. A stream 182 of partially vaporized bottoms liquid is fed to a phase separator S4 and the vapor phase is fed back to the column C1. The liquid phase is removed from the separator S4 as stream 186, pumped in pump P3, warmed by indirect heat exchange in HE1 to form a stream 190 of warmed bottoms liquid and pumped further in pump P4 to produce a stream 192 of waste liquid.

A stream 170 of liquid taken from an intermediate location in the distillation column C1 is fed to HE1 where it is at least partially vaporized by indirect heat exchange against condensing recycle fluid from the heat pump cycle to produce a stream 172 of at least partially vaporized intermediate liquid which is fed back to the distillation column C1.

Figure 1B:
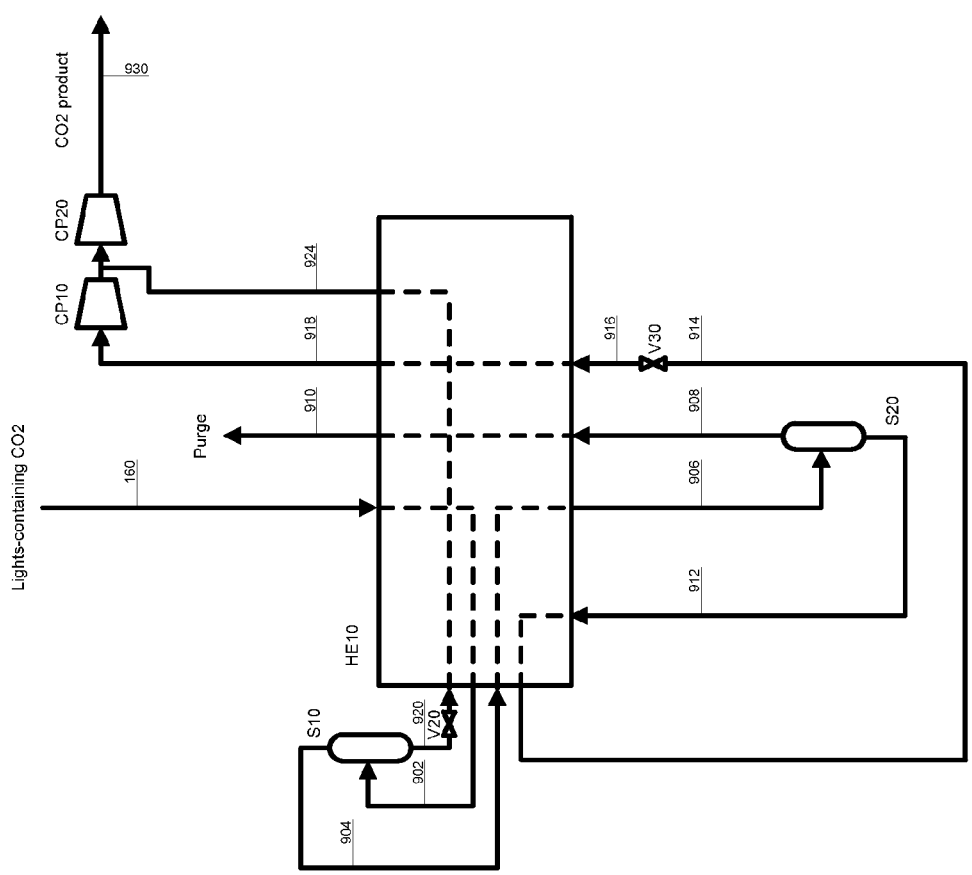
FIG. 1B is a flow sheet depicted a conventional process for removing "light" impurities from the carbon dioxide product of the process depicted in FIG. 1A.

In the process depicted in FIG. 1B, a stream of carbon dioxide containing "light" impurities, such as stream 160 in FIG. 1A, is fed to a heat exchange HE10 where it is cooled and partially condensed. The two-phase stream is phase separated in phase separator S10 into a vapor phase containing most of the "light" impurities and some carbon dioxide, and a liquid phase containing most of the carbon dioxide. The liquid phase 920 is expanded across valve V20, vaporized by indirect heat exchange in HE10 and compressed in CP20 to form the carbon dioxide product gas 930.

Carbon dioxide is recovered from the vapor phase 940 from S10 by cooling and partially condensing the vapor phase by indirect heat exchange in HE10 and subsequent phase separation in phase separator S20. The further vapor phase 908 is warmed by indirect heat exchange in HE10 and purged from the process. The further liquid phase 912 is warmed by indirect heat exchange in HE10, expanded across valve V30, vaporized by indirect heat exchange in HE10, compressed in compressor CP10 and combined with the vaporized liquid phase from S10 prior to further compression in CP20 to produce the product gas 930.

Figure 2:
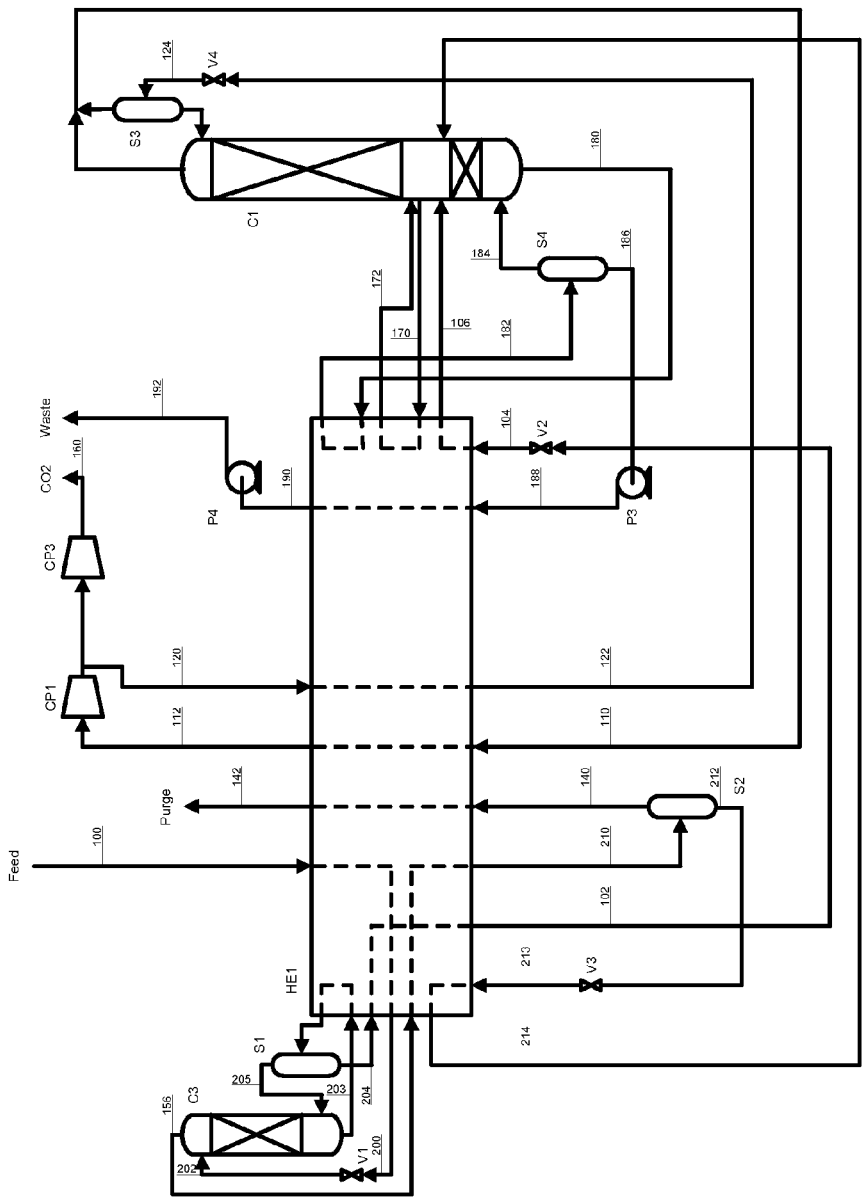
FIG. 2 is a flow sheet depicting a first embodiment of the present invention in which the process of FIG. 1 is modified such that the "light" impurities are removed from the feed and carbon dioxide is recovered from the "light" impurity(s)-enriched vapor by partial condensation and phase separation.

The process depicted in FIG. 2 is a modification of the process of FIGS. 1A & 1B in which "light" impurities are removed from the feed to the process rather than from the carbon dioxide product. The features of FIG. 2 that are common to FIGS. 1A & 1B have been given the same reference numerals. The following is a discussion of the features of FIG. 2 that distinguish the process over that depicted in FIGS. 1A & 1B.

Stream 100 of crude carbon dioxide vapor is cooled and condensed by indirect heat exchange in heat exchanger HE1 to form a stream 200 of condensed feed which is expanded across valve V1 and fed to a distillation column C3 of a first column system where it is separated into "light" impurity-enriched overhead vapor 156 and "light" impurity-depleted crude carbon dioxide liquid 204 comprising the heavy impurity.

The overhead vapor 156 is cooled by indirect heat exchange in heat exchanger HE1 to form partially condensed "light" impurity-enriched fluid 210 which is phase separated in separator S2. The residual vapor rich in light impurity(s) 140 is warmed by indirect heat exchange in heat exchanger HE1 and purged from the process. The liquid phase containing recovered carbon dioxide 212 is expanded across valve V3, vaporized by indirect heat exchange in heat exchanger HE1 and then fed to the distillation column C1 of a second column system for mass transfer separation (stream 214).

Column C3 of the first column system is re-boiled by indirect heat exchange in HE1 against condensing feed. In this regard, bottoms liquid 203 is removed from column C3, partially vaporized by indirect heat exchange in HE1 against condensing feed and fed to separator S1 where the vapor and liquid phases are separated. The vapor phase 205 is returned to the column C3 and the liquid phase 204 is subcooled by indirect heat exchange in HE1, expanded across valve V2, vaporized by indirect heat exchange in HE1 and then fed to the distillation column C1 of the second column system for mass transfer separation (stream 106).

Figure 3:
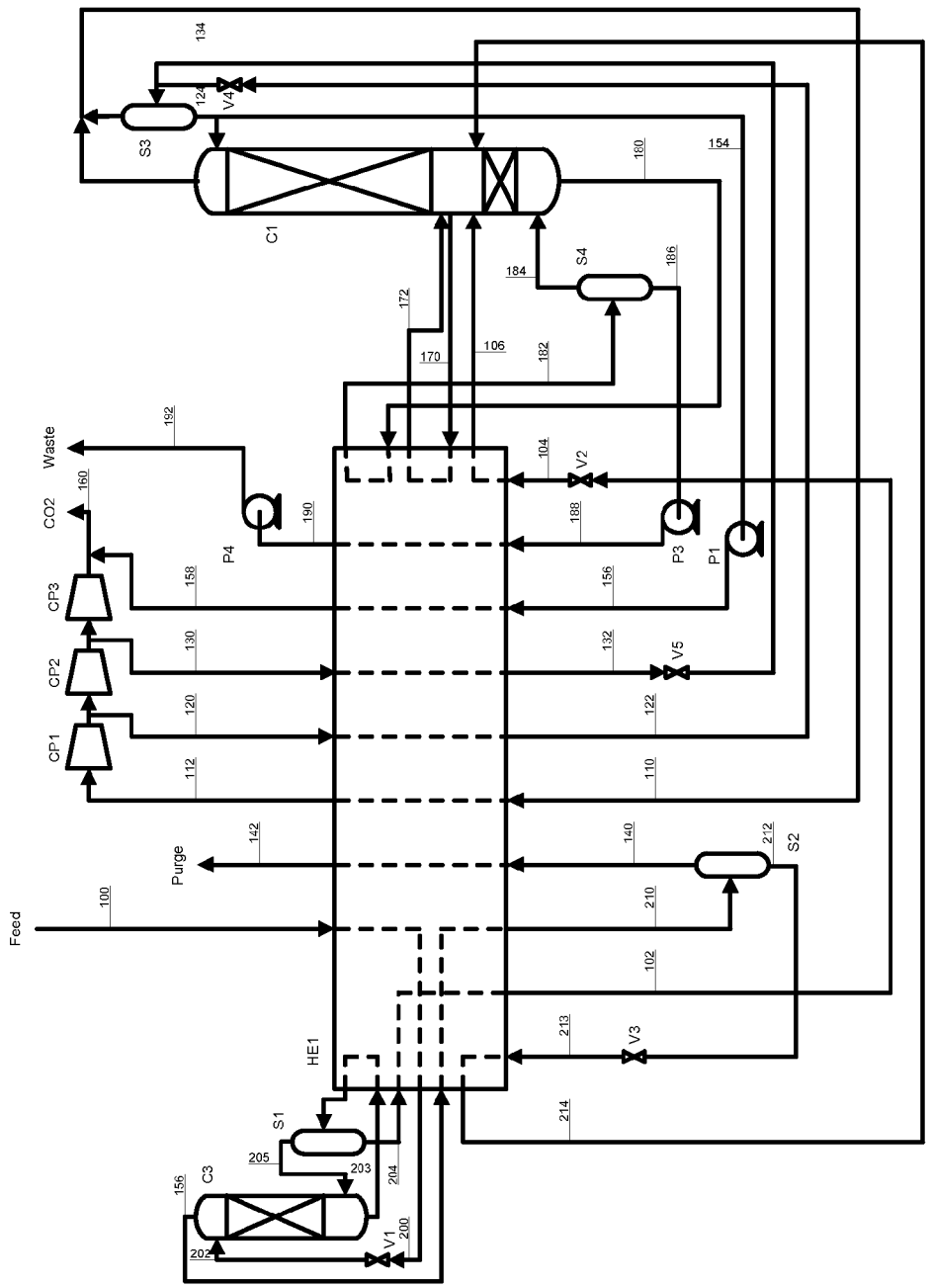
FIG. 3 is a flow sheet depicting a modified arrangement of the embodiment depicted in FIG. 2 in which the process for removing the "heavy" impurities involves a heat pump at two different pressures and in which part of the carbon dioxide product from the second column system is taken as liquid, pumped and vaporized to form part of the carbon dioxide product.

The process depicted in FIG. 3 is a modification of the process of FIG. 2 in which the heat pump cycle has two recycle pressures. The features of FIG. 3 that are common to the previous figures have been given the same reference numerals. The following is a discussion of the distinguishing features of FIG. 3.

Rather than being compressed in compressor CP3 and taken as product, the part of the exhaust from compressor CP1 that is not recycled is compressed to an intermediate pressure in compressor CP2 and divided into two portions. A first portion is fed to compressor CP3 for compression as in the previous figures. However, a second portion 130 is cooled by indirect heat exchange in HE1 to form condensed carbon dioxide fluid 132 at a second recycle pressure that is greater than the first recycle pressure. The fluid is then expanded across valve V5 and then combined with the first recycle fluid prior to phase separation in S3.

In addition, a part 154 of the liquid carbon dioxide from separator S3 is pressurized in pump P1 and vaporized by indirect heat exchange in HE1 to form stream 158 which is then combined with the exhaust from compressor CP3 to form the carbon dioxide product 160.

Figure 4:
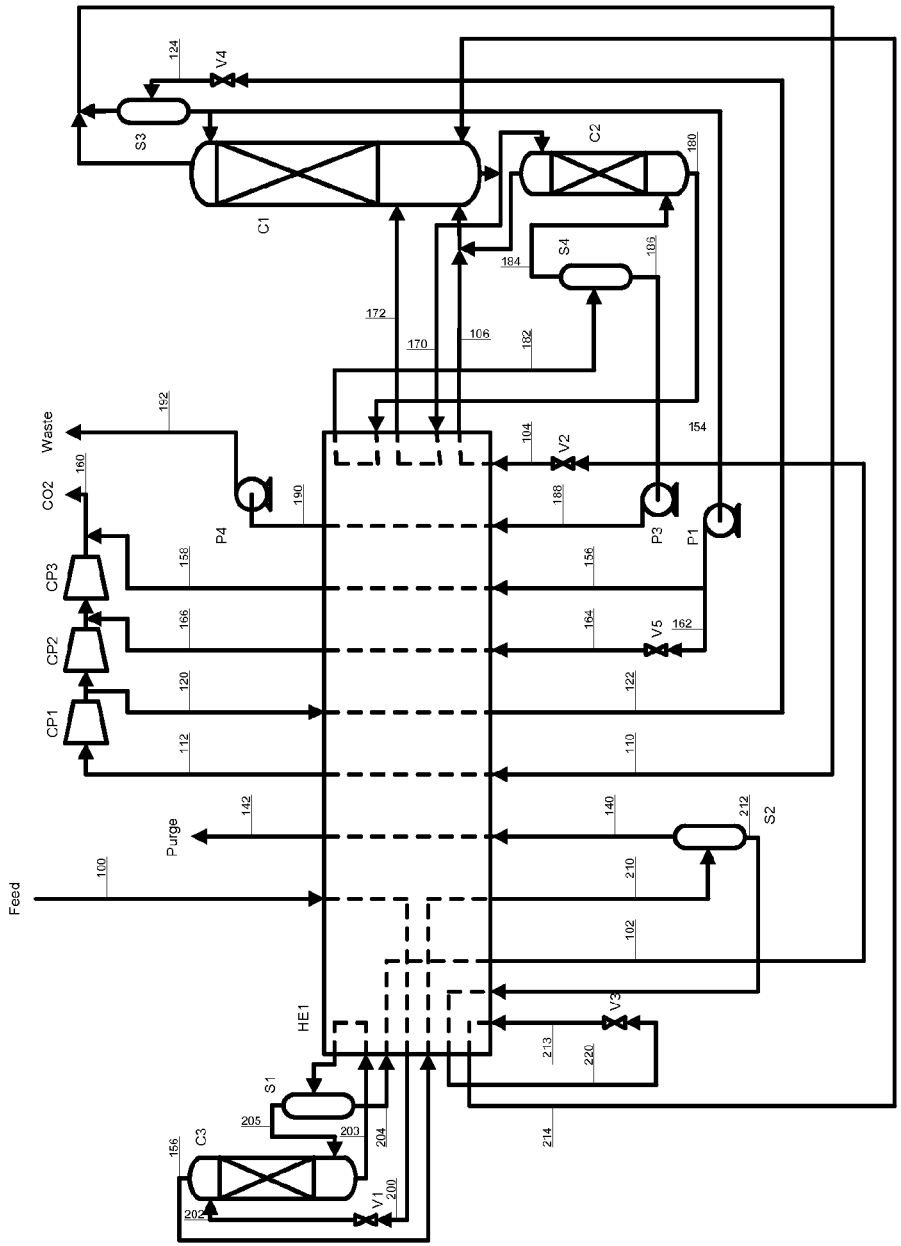
FIG. 4 is a flow sheet depicting another modified arrangement of the embodiment depicted in FIG. 2 in which the process for removing the "heavy" impurities involves a split column, in which the recovered carbon dioxide liquid is heated prior to being expanded, vaporized and fed to the second column system, and in which the carbon dioxide liquid from the second column system is vaporized at two different pressures.

The process depicted in FIG. 4 is a modification of the process of FIG. 2 in which the single distillation column C1 of the second column system is replaced with a split distillation column C1/C2, in which part of the carbon dioxide-enriched fluid is taken as liquid and vaporized at two different pressures and in which the recovered carbon dioxide is warmed by indirect heat exchange prior to expansion and vaporization. The features of FIG. 4 that are common to the previous figures have been given the same reference numerals. The following is a discussion of the distinguishing features of FIG. 4.

The vapor phase 184 from separator S4 is fed to the base of distillation column C2 of the second column system. The overhead vapor from distillation column C2 is combined with the primary feed to distillation column C1 of the second column system. Distillation column C2 is re-boiled by indirect heat exchange against condensing feed in HE1.

The bottoms liquid from distillation column C1 is divided into two portions. The first portion is used to provide reflux in distillation column C2. The second portion 170 is vaporized by indirect heat exchange against condensing recycle fluid in HE1 and returned to the distillation column C1 as stream 172.

The recovered carbon dioxide 212 from S2 is warmed by indirect heat exchange in HE1 prior to being expanded across valve V3. Such warming is to ensure that no solid carbon dioxide is formed on expansion and enables the "light" impurity-enriched overhead vapor to be cooled further thereby improving recovery of carbon dioxide condensate in S2.

Instead of all of the carbon dioxide-enriched liquid from S3 being fed to the second column system as reflux, the liquid is divided into two portions. The first portion is fed to the second column system as reflux and the second portion 154 is pumped in P1 and then divided into two parts. The first part 162 is expanded across valve V5, vaporized by indirect heat exchange in HE1, combined with the compressed carbon dioxide gas from CP2 and then compressed in CP3. The second part 156 is vaporized by indirect heat exchange in HE1, combined with the compressed carbon dioxide gas from CP3 and the combined gas 160 is taken as carbon dioxide product.

Figure 5:
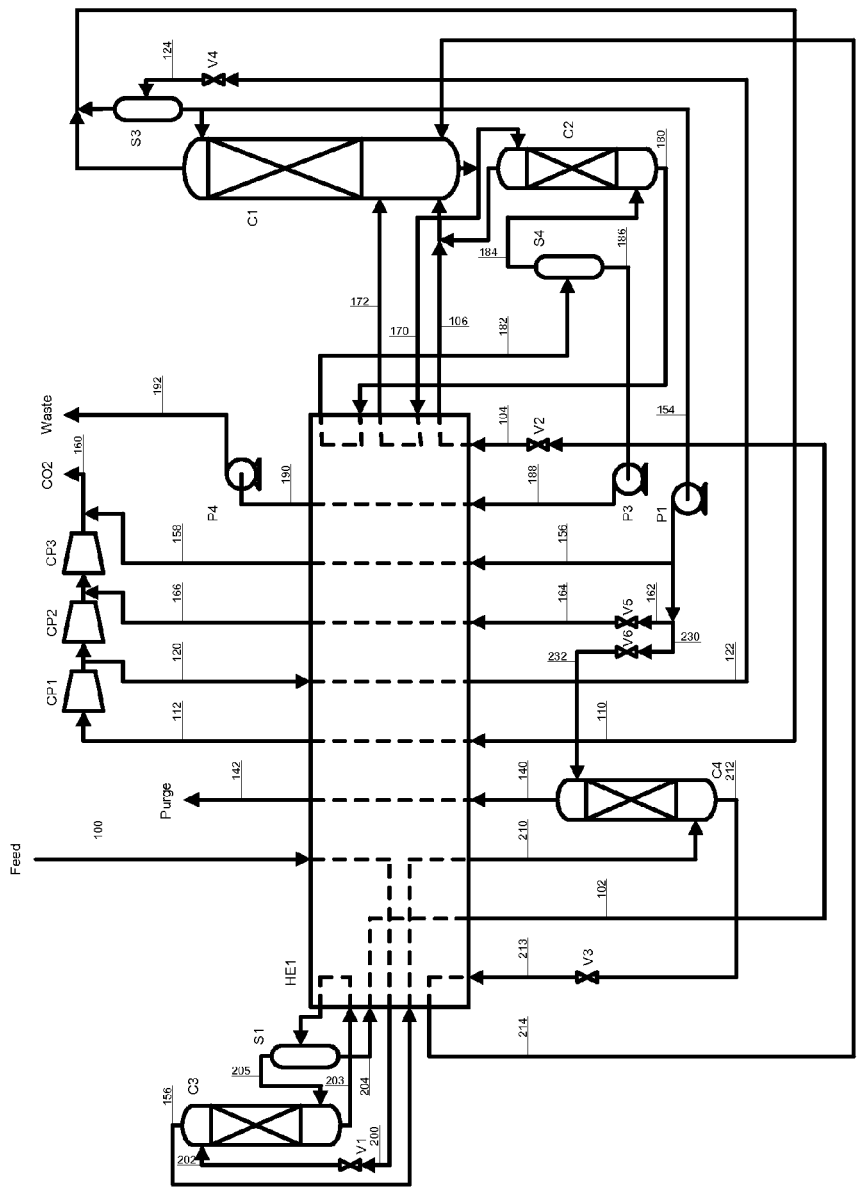
FIG. 5 is a flow sheet depicting a modified arrangement of the embodiment depicted in FIG. 4 in which carbon dioxide is recovered from the "light" impurity(s)-enriched vapor using a wash column.

The process depicted in FIG. 5 is a modification of the process of FIG. 4 in which residual "heavy" impurity and carbon dioxide in the vapor phase of the "light" impurity-enriched overhead vapor from the first column system after cooling and partial condensation by indirect heat exchange in HE1 are washed out from the vapor phase and recovered. In FIG. 5, the recovered carbon dioxide 212 is not heated prior to expansion and vaporization. The features of FIG. 5 that are common to the previous figures have been given the same reference numerals. The following is a discussion of the distinguishing features of FIG. 5.

The overhead vapor 156 from distillation column C3 of the first column system is cooled and partially condensed by indirect heat exchange in HE1 and fed as stream 210 to wash column C4 where the vapor phase is washed using liquid carbon dioxide 232 from the second column system. Washing the vapor phase in this way enables residual "heavy" impurity and some of the carbon dioxide in the vapor phase to be recovered. The overhead vapor 140 from wash column C4 is warmed in HE1 and purged from the process. The bottoms liquid 212 is expanded in valve V3, vaporized in HE1 and forms the supplementary feed 214 to distillation column C1 of the second column system.

The pumped carbon dioxide liquid from pump P1 is divided into three portions. The first and second portions are vaporized at different pressures and compressed to form the carbon dioxide product as in FIG. 4. However, the third portion 230 is expanded across valve V6 and used as the washing liquid 232 in wash column C4.

Figure 6:
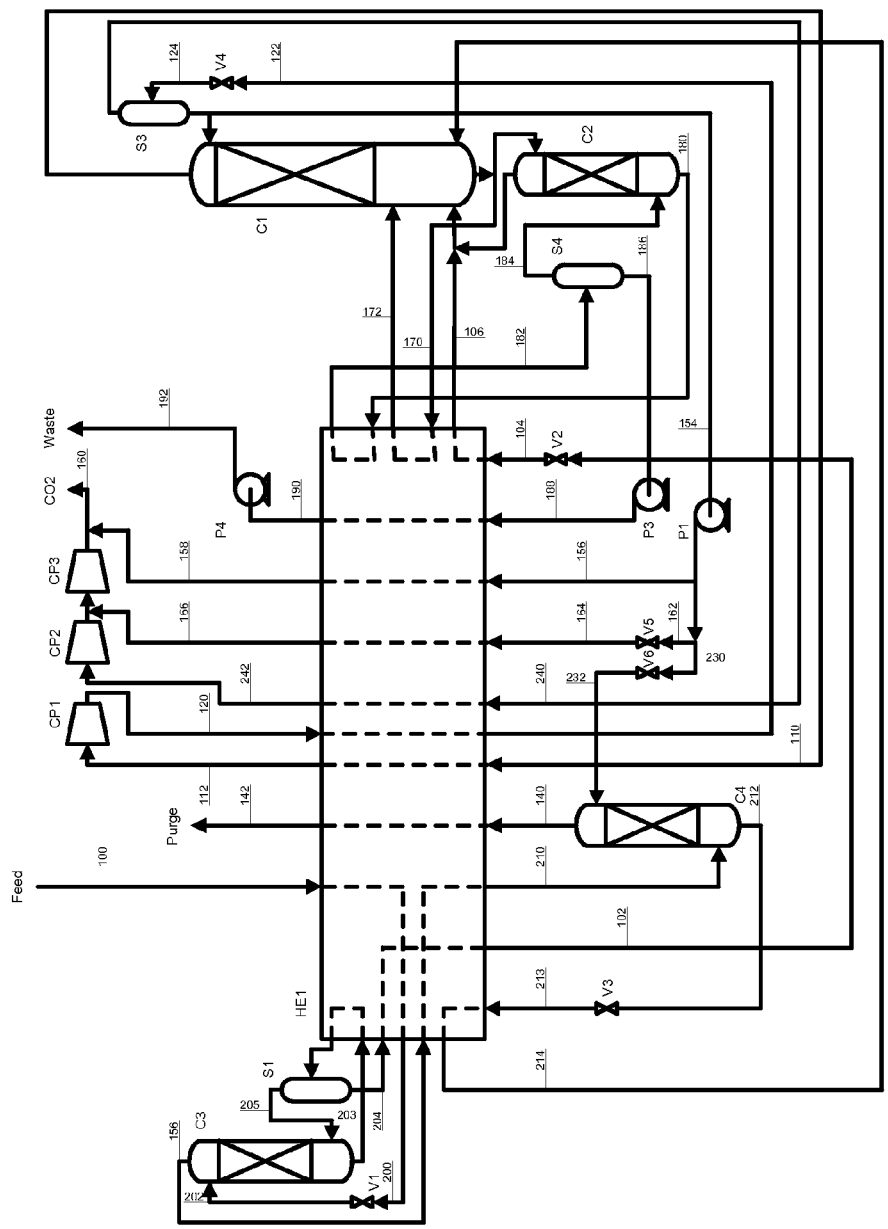
FIG. 6 is a flow sheet depicting a modified arrangement of the embodiment depicted in FIG. 5 involving a different single pressure heat pump cycle.

The process depicted in FIG. 6 is a modification of the process of FIG. 5 in which the heat pump cycle has been modified. The features of FIG. 6 that are common to the previous figures have been given the same reference numerals. The following is a discussion of the distinguishing features of FIG. 6.

Instead of the exhaust from compressor CP1 being divided into two portions, the entire flow 120 is cooled and condensed by indirect heat exchange in HE1, expanded across valve V4 and fed as reflux to distillation column C1 via separator S3 of the second column system. In addition, the entire feed 242 to compressor CP2 is provided by the carbon dioxide vapor 240 from separator S3 that has been warmed by indirect heat exchange in HE1.

Figure 7:
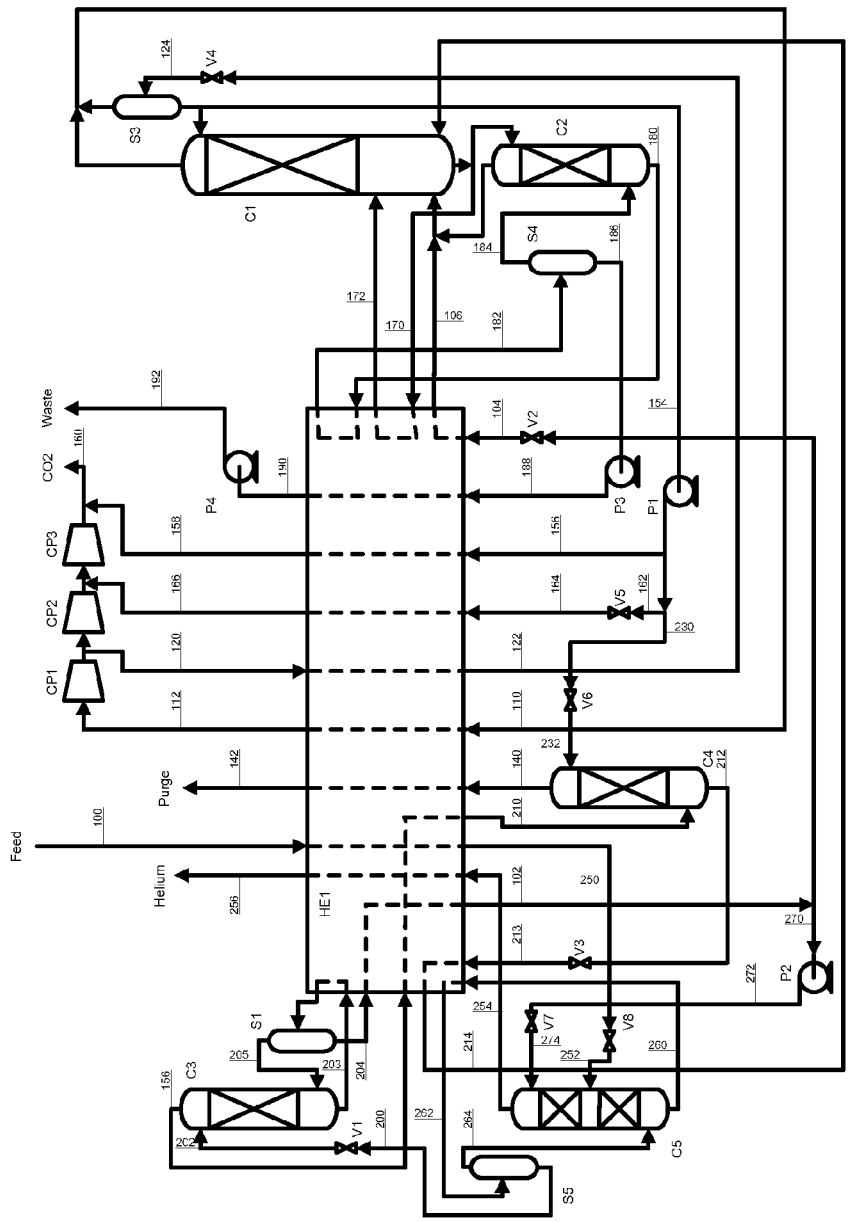
FIG. 7 is a flow sheet depicting a modified arrangement of the embodiment depicted in FIG. 5 in which the first column system comprises a first distillation column system for removing more volatile "light" impurities, e.g. helium, and a second distillation column system for removing less volatile "light" impurities", e.g. nitrogen, argon, methane and/or ethane.

The process depicted in FIG. 7 is a modification of the process of FIG. 5 with initial helium recovery. The features of FIG. 7 that are common to the previous figures have been given the same reference numerals. The following is a discussion of the distinguishing features of FIG. 7.

The condensed feed 250 is expanded across valve V8 and fed to an intermediate location in a distillation column C5 of the first column system where it is separated by mass transfer into helium-enriched overhead vapor 254 and helium-depleted crude carbon dioxide bottoms liquid 260. The overhead vapor is warmed by indirect heat exchange in HE1 to form a gaseous product 256 containing helium.

The distillation column C5 is reboiled by indirect heat exchange against condensing feed in HE1 with the vapor phase 264 being sent to column C5 and bottoms liquid 200 being fed to distillation column C3 of the first column system for mass transfer separation after expansion across valve V1.

Reflux 274 for distillation column C5 is provided by a portion 270 of the bottoms liquid from distillation column C3 which is pumped in pump P2. Valve V7 is typically a control valve only and not an expansion valve.

Figure 8:
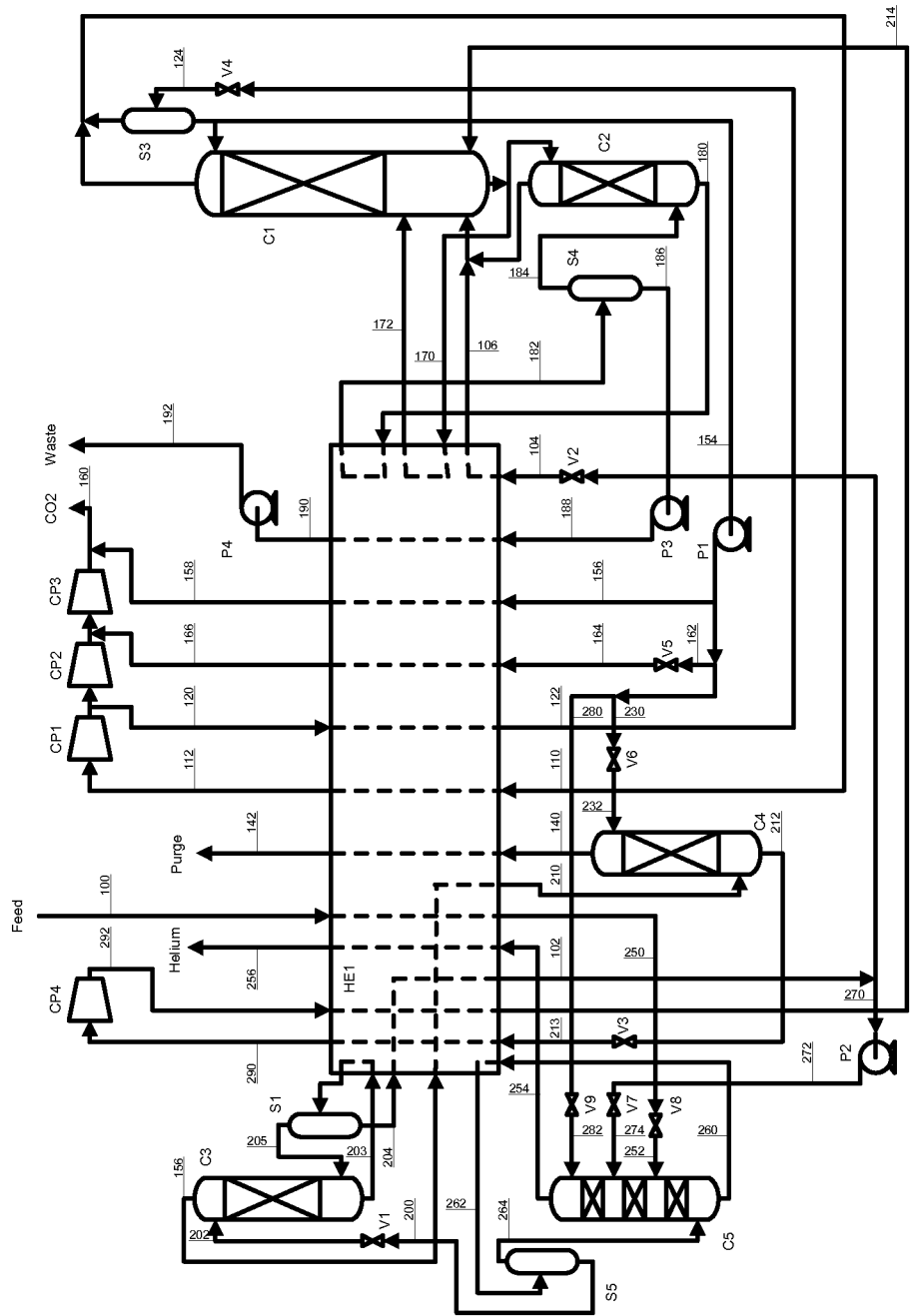
FIG. 8 is a flow sheet depicting a modified arrangement of the embodiment depicted in FIG. 7 in which the first distillation column system has an additional reflux of pure carbon dioxide and recovered carbon dioxide bottoms liquid is expanded, vaporized, warmed, compressed and cooled prior to removal of the "heavy" impurities.

The process depicted in FIG. 8 is a modification of the process of FIG. 7 in which the helium recovery column is provided with additional reflux using pure carbon dioxide liquid from the second column system. The features of FIG. 8 that are common to the previous figures have been given the same reference numerals. The following is a discussion of the distinguishing features of FIG. 8.

Part of the bottoms liquid from distillation column C3 of the first column system (stream 274) is fed to an intermediate location in distillation column C5 after pumping in pump P2.

In addition, liquid carbon dioxide from separator S3 of the second column system is pumped in pump P1 and divided into four portions. The first and second portions are used to form part of the gaseous carbon dioxide product, and the third portion is used as wash liquid in wash column C4, as in FIG. 7. However, a fourth portion 280 is expanded across valve V9 and fed to the top of distillation column C5 of the first column system to provide additional reflux, 282, to the column. The fourth portion is expanded to a significant extent since the pressure produced by pump P1 is higher than needed for this small flow but in this case it is not worth installing an additional pump to provide exactly the required pressure.

Further, bottoms liquid 212 from wash column C4 is expanded across valve V3, vaporized by indirect heat exchange in HE1, compressed in compressor CP4 and cooled before being fed to distillation column C1 of the second column system as the supplementary feed 214.

Figure 9:
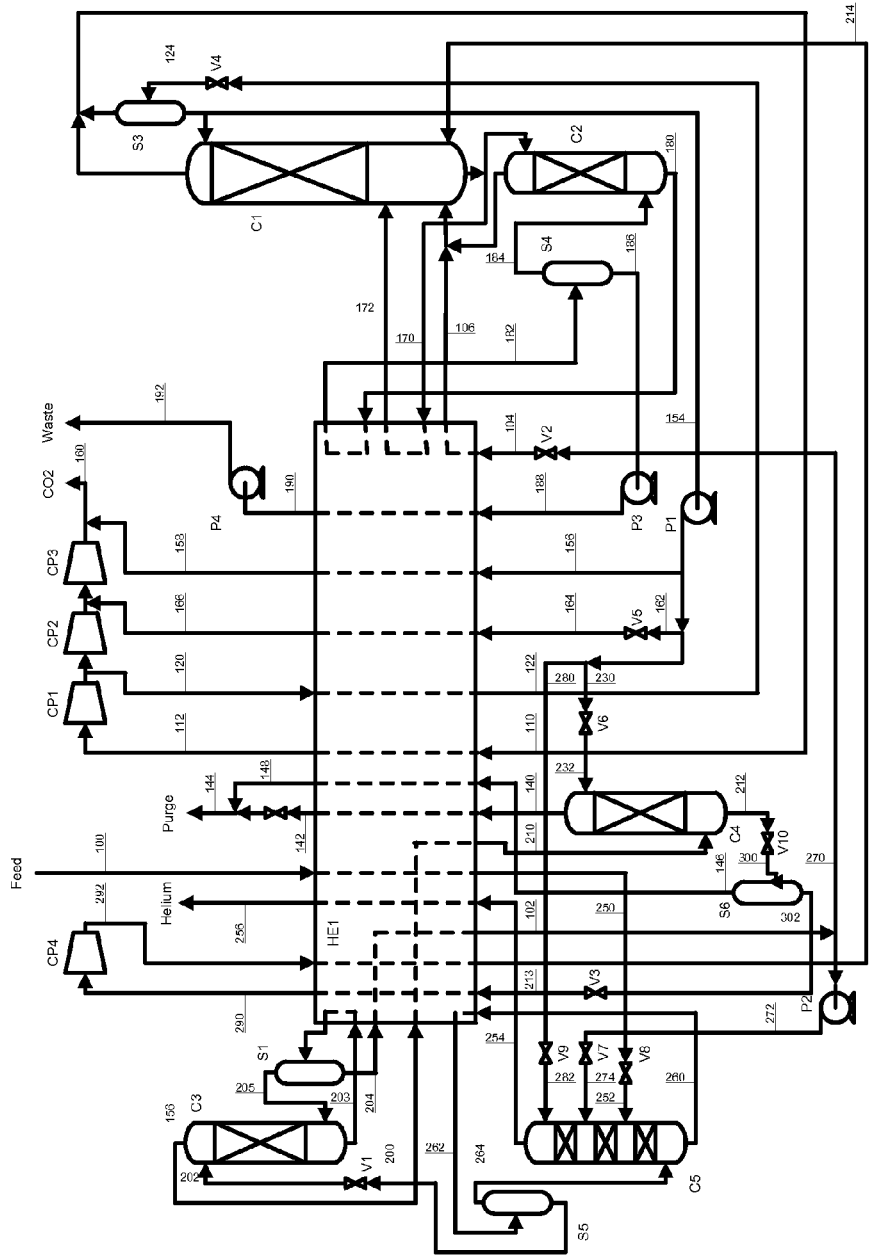
FIG. 9 is a flow sheet depicting a modified arrangement of the embodiment depicted in FIG. 8 in which recovered carbon dioxide bottoms liquid is expanded and phase separated to remove further "light" impurities and hence increase carbon dioxide purity.

The process depicted in FIG. 9 is a modification of the process of FIG. 8 comprising an intermediate pressure flash to remove further "light" impurities from the bottoms liquid from the wash column C4 and hence from the feed to second column system and allow higher purity carbon dioxide. The features of FIG. 9 that are common to the previous figures have been given the same reference numerals. The following is a discussion of the distinguishing features of FIG. 9.

The bottoms liquid 212 from wash column C4 is expanded and partially vaporized across valve V10. The fluid 300 is then phase separated in separator S6. The vapor phase 146 is warmed by indirect heat exchange in HE1 and combined with the purge stream. The liquid phase 302 is further expanded across V3, vaporized and warmed by indirect heat exchange in HE1, compressed in compressor CP4, cooled by indirect heat exchange in HE1 and fed as the supplementary feed 214 to distillation column C1 of the second column system.

Figure 10:
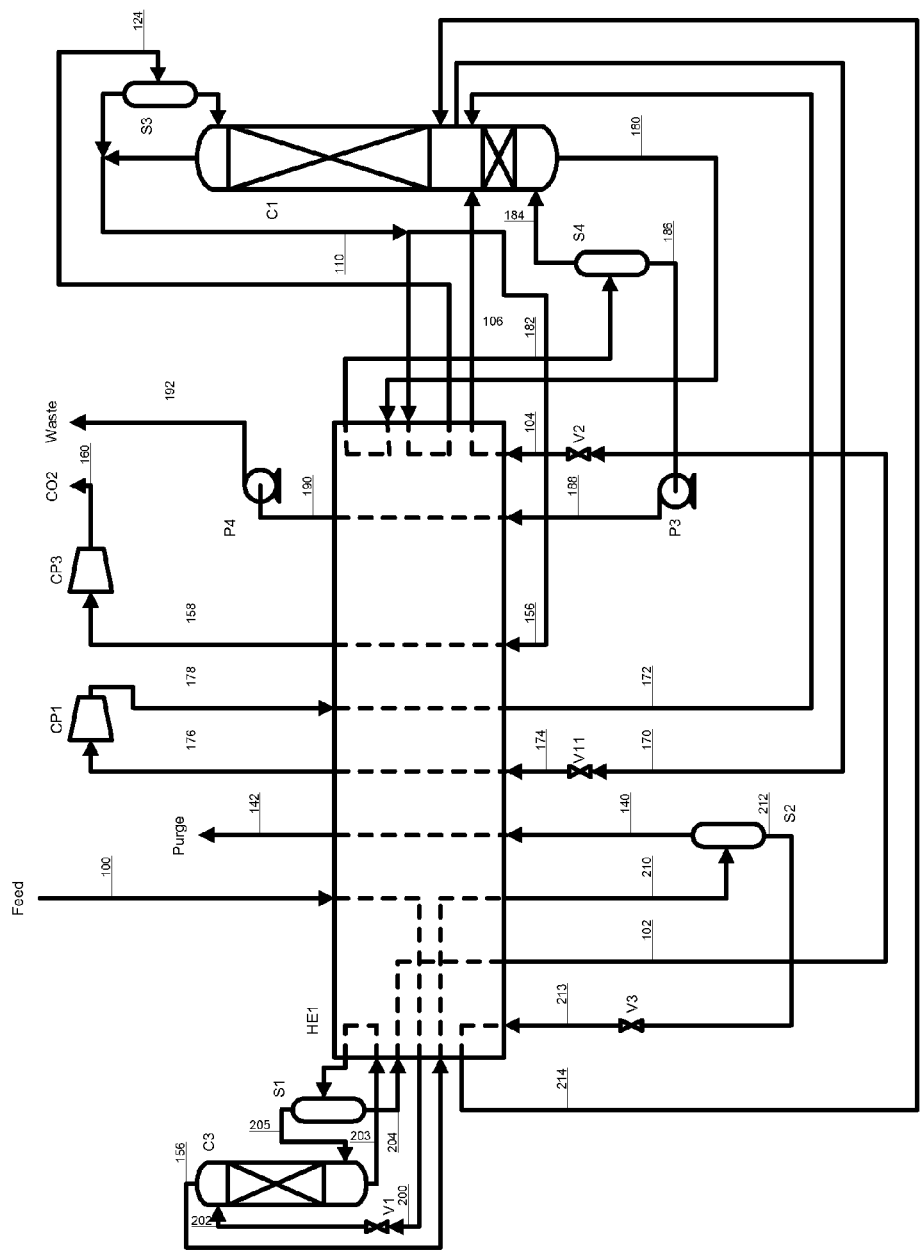
FIG. 10 is a flow sheet depicting a modified arrangement of the embodiment depicted in FIG. 2 in which the working fluid in the heat pump cycle is intermediate liquid from the second column system which is expanded and used to condense the overhead vapor in the second column system by indirect heat exchange.

The process depicted in FIG. 10 is a modification of the process of FIG. 2 that uses an alternative heat pump cycle whose working fluid is an intermediate stream from the column system C1. The features of FIG. 10 that are common to the previous figures have been given the same reference numerals. The following is a discussion of the distinguishing features of FIG. 10.

Figure 11:
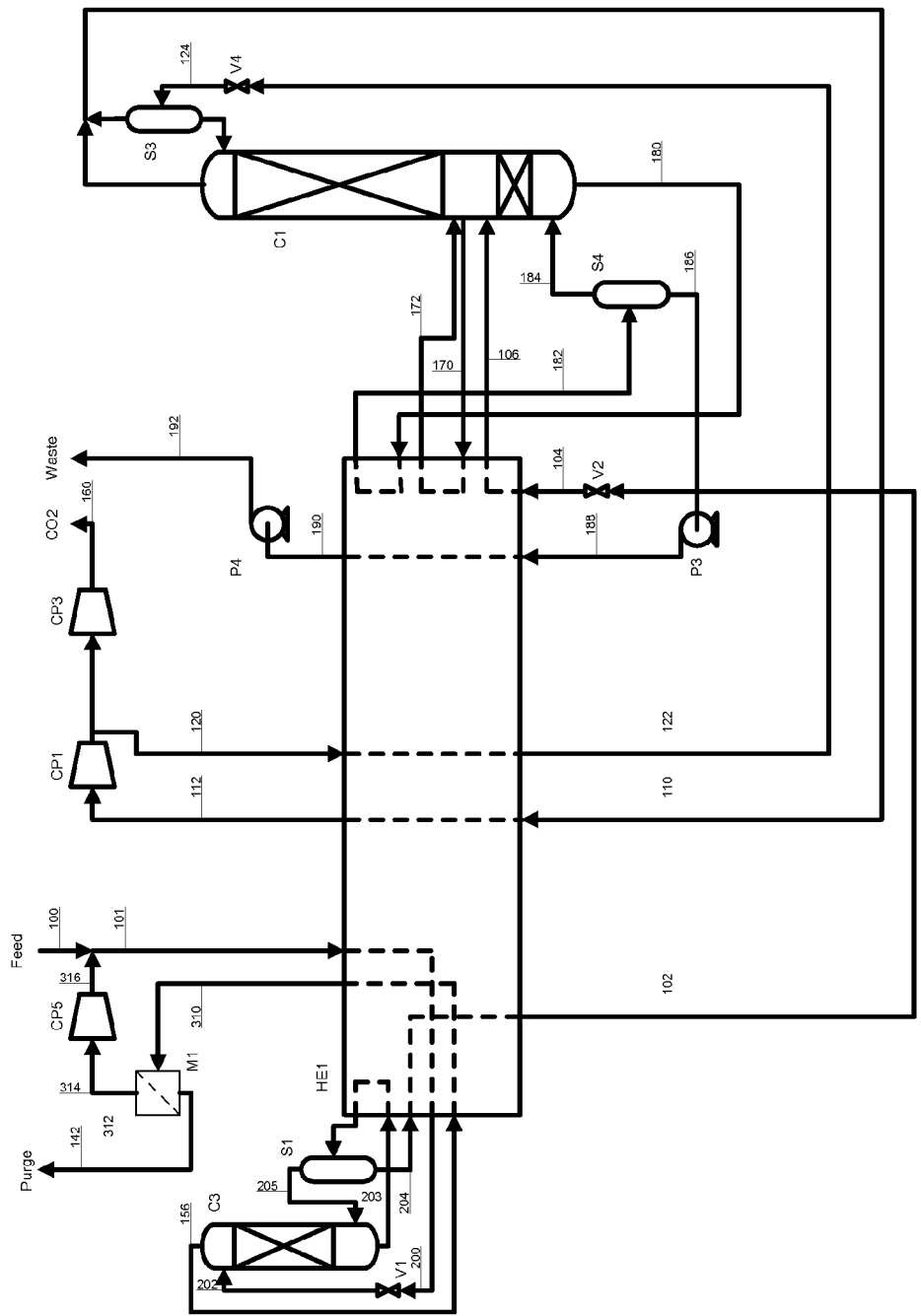
FIG. 11 is a flow sheet depicted a modified arrangement of the embodiment depicted in FIG. 2 involving a "warm" recovery of carbon dioxide using a membrane separation system.

Rather than being warmed in HE1 and compressed in CP1, the overhead vapor 110 from the second column system (C1 and S3) is condensed in HE1 and returned as stream 124 to separator S3 of the second column system to provide reflux to the column C1. The required condensing duty is provided by vaporizing an intermediate liquid stream 174 that has been withdrawn from column C1 and expanded in valve V11. The vaporized intermediate liquid is further warmed in HE1 to form stream 176, which is compressed in CP1, recooled in HE1 and fed to C1 as stream 172 to provide intermediate vapor. In this way, the heat pump provides boilup and reflux to the second column system, The process depicted in FIG. 11 is a modification of the process of FIG. 2 in which carbon dioxide is recovered from the overhead vapor of the first column system C3 by means of a warm process M1. The features of FIG. 11 that are common to the previous figures have been given the same reference numerals. The following is a discussion of the distinguishing features of FIG. 11.

Instead of being cooled in HE1, the overhead vapor 156 from the first column system C3 is warmed in HE1 and fed as stream 310 to warm separation device M1, which could be a membrane or other unit. Recovered carbon-dioxide enriched gas 314 is recompressed in compressor CP5 to form stream 316 and mixed with the feed 100. Alternatively, this stream 316 may be separately cooled and fed to either the first or second column systems. Depending on the warm separation process chosen and the destination of the recycled stream, recompression in CP5 might not be necessary. The carbon dioxide-depleted gas 142 from M1 is purged from the process, or sent for further processing depending on its composition.

Aspects of the present invention include:

1. A process for purifying crude carbon dioxide fluid comprising at least one "light" impurity and at least one "heavy" impurity, said process comprising:
  cooling said crude carbon dioxide fluid above the triple point pressure of carbon dioxide by indirect heat exchange to produce cooled crude carbon dioxide fluid;
  feeding said cooled crude carbon dioxide fluid to a first column system for mass transfer separation to produce "light" impurity-enriched overhead vapor and "light" impurity-depleted carbon dioxide bottoms liquid comprising said "heavy" impurity;

re-boiling said first column system by vaporizing "light" impurity-depleted bottoms liquid by indirect heat exchange to provide vapor for said first column system;

feeding "light" impurity-depleted bottoms liquid from said first column system to a second column system for mass transfer separation to produce carbon dioxide-enriched overhead vapor and "heavy" impurity-enriched bottoms liquid;

providing carbon dioxide-enriched liquid as reflux for said second column system;

re-boiling said second column system by indirect heat exchange to provide vapor for said second column system;

wherein said first and second column systems operate above the triple point pressure and below the critical pressure of carbon dioxide;

wherein said process comprises at least one heat pump cycle using as working fluid carbon dioxide-containing fluid from said second column system;

wherein said second column system is re-boiled by at least partially vaporizing at least one "heavy" impurity-enriched liquid in or taken from said second column system by indirect heat exchange against carbon dioxide-containing vapor from said second column system; and wherein said overhead vapor from said first column system comprises carbon dioxide and at least a portion of said carbon dioxide is recovered from said overhead vapor to produce "light" impurity-rich residual gas and recovered carbon dioxide.

2. A process according to #1, wherein said recovered carbon dioxide is fed to said second column system for mass transfer separation.

3. A process according to #1 or #2, wherein said cooled crude carbon dioxide fluid is expanded prior to being fed to said first column system.

4. A process according to #3, wherein said cooled crude carbon dioxide fluid is below the critical pressure of carbon dioxide prior to expansion.

5. A process according to #3, wherein said cooled crude carbon dioxide fluid is above the critical pressure of carbon dioxide prior to expansion.

6. A process according to any of #1 to #5, wherein said overhead vapor from said first column system is cooled prior to carbon dioxide recovery.

7. A process according to any of #1 to #6, wherein said overhead vapor is cooled by indirect heat exchange to condense carbon dioxide in the vapor which is recovered by phase separation.

8. A process according to any of #1 to #6, wherein carbon dioxide and said at least one "heavy" impurity are washed out of said overhead vapor from said first column system in a wash column using as washing liquid carbon dioxide-enriched liquid from said second column system.

9. A process according to #8, wherein said overhead vapor from said first column system is cooled but not condensed prior to being fed as cooled vapor to said wash column.

10. A process according to #8 or #9, wherein said overhead vapor from said first column system is cooled by direct heat exchange with said washing liquid in said wash column.

11. A process according to any of #8 to #10, wherein said overhead vapor from said first column system is cooled by indirect heat exchange.

12. A process according to any of #1 to #5, wherein said overhead vapor from said first column system is warmed by indirect heat exchange prior to carbon dioxide recovery.

13. A process according to any of #1 to #12, wherein carbon dioxide is recovered from said overhead vapor from said first column system using a process selected from the group consisting of adsorption; absorption; membrane separation; and solidification.

14. A process according to any of #1 to #13, wherein said second column system comprises at least two distillation sections and said "light" impurity depleted carbon dioxide bottoms liquid from said first column system is fed to said second column system at an intermediate zone between adjacent distillation sections.

15. A process according to #14, wherein said second column system is re-boiled by vaporizing liquid in or taken from said or another intermediate zone.

16. A process according to any of #1 to #15, wherein said crude carbon dioxide fluid is either a vapor that is at least partially condensed during said cooling, or a supercritical fluid that is "pseudo-condensed" during said cooling, to produce said cooled crude carbon dioxide fluid.

17. A process according to #16, wherein said cooled crude carbon dioxide fluid is expanded prior to being fed to said first column system.

18. A process according to #16 or #17, wherein re-boil duty for said first column system is provided at least in part by indirect heat exchange against condensing, or pseudo-condensing, crude carbon dioxide fluid.

19. A process according to any of #16 to #18, wherein re-boil duty for said first column system is provided at least in part by indirect heat exchange against condensing recycle fluid in said heat pump cycle.

20. A process according to any of #1 to #19, wherein said first column system comprises a distillation column system, said cooled crude carbon dioxide fluid being fed to said distillation column system for distillation to produce said "light" impurity-enriched overhead vapor and said "light" impurity-depleted carbon dioxide bottoms liquid.

21. A process according to any of #1 to #20, wherein said crude carbon dioxide fluid comprises at least one first "light" impurity and at least one second "light" impurity, said first "light" impurity being more volatile than said second "light" impurity.

22. A process according to #21, wherein said first column system comprises a first distillation column system and a second distillation column system, said process comprising:

feeding said cooled crude carbon dioxide fluid to said first distillation column system to produce overhead vapor enriched in said first "light" impurity, and bottoms liquid depleted in said first "light" impurity;

re-boiling said first distillation column system by indirect heat exchange to provide vapor for said first distillation column system;

feeding bottoms liquid from said first distillation column system to said second distillation column system to produce said "light" impurity-enriched overhead vapor and said "light" impurity depleted carbon dioxide bottoms liquid; and feeding bottoms liquid from said second distillation column system to said first distillation column system, preferably as reflux.

23. A process according to #22, wherein said bottoms liquid from said second distillation column system is pumped prior to being fed to said first distillation column system.

24. A process according to #22 or #23, wherein reflux for said first distillation column system is provided using carbon dioxide-enriched liquid from said second column system.

25. A process according to #24, wherein said carbon dioxide-enriched liquid from said second column system is pumped prior to being fed as reflux to said first distillation column system.

26. A process according to any of #22 to #25, wherein said bottoms liquid from said first distillation column system is expanded prior to being fed to said second distillation column system.

27. A process according to any of #22 to #26, wherein helium is a first "light" impurity and wherein methane, ethane and nitrogen are second "light" impurities.

28. A process according to any of #1 to #27, wherein said "light" impurity depleted carbon dioxide bottoms liquid from said first column system is subcooled prior to being fed to said second column system.

29. A process according to any of #1 to #28, wherein said "light" impurity depleted carbon dioxide bottoms liquid from said first column system is expanded prior to being fed to said second column system.

30. A process according to #29, wherein said "light" impurity depleted carbon dioxide bottoms liquid from said first column system is subcooled by indirect heat exchange prior to being expanded.

31. A process according to any of #1 to #30, wherein said "light" impurity depleted carbon dioxide bottoms liquid from said first column system is at least partially vaporized prior to being fed to said second column system.

32. A process according to 31, wherein said "light" impurity depleted carbon dioxide bottoms liquid from said first column system is subcooled by indirect heat exchange and optionally expanded prior to being at least partially vaporized.

33. A process according to #31 or #32, wherein said "light" impurity depleted carbon dioxide bottoms liquid from said first column system is expanded prior to being at least partially vaporized.

34. A process according to any of #1 to #33, wherein said heat pump cycle comprises:
  after optionally at least partially vaporizing said carbon dioxide-containing working fluid from said second column system by indirect heat exchange, warming said optionally at least partially vaporized carbon dioxide-containing working fluid to produce warmed carbon dioxide-containing gas;
  compressing said warmed carbon dioxide-containing gas to form compressed carbon dioxide-containing recycle gas;
  cooling and optionally at least partially condensing said compressed carbon dioxide-containing recycle gas by indirect heat exchange to produce cooled carbon dioxide-containing recycle fluid; and
  recycling at least a portion of said cooled carbon dioxide-containing recycle fluid to said second column system,
  wherein said working fluid is expanded as required either prior to said optional vaporization and warming to produce said warmed carbon dioxide-containing gas, or after said cooling and optional condensation to produce said cooled carbon-dioxide containing recycle fluid prior to recycling said recycle fluid to said second column system.

35. A process according to any of #1 to #34, wherein said working fluid is carbon dioxide-enriched overhead vapor, said heat pump cycle comprising:
  warming said carbon dioxide-enriched overhead vapor by indirect heat exchange to produce warmed carbon dioxide-enriched gas;
  compressing said carbon dioxide-enriched gas to produce compressed carbon dioxide-enriched recycle gas;
  using said compressed carbon dioxide-enriched recycle gas to provide at least a part of the reboil duty required to vaporize said "heavy" impurity-enriched liquid(s) thereby cooling and at least partially condensing said compressed carbon dioxide-enriched recycle gas to produce carbon dioxide-enriched liquid;
  expanding said carbon dioxide-enriched liquid to produce expanded carbon dioxide-enriched liquid; and
  using at least a portion of said expanded carbon dioxide-enriched liquid to provide said reflux to said second column system.

36. A process of any of #1 to #34, wherein said working fluid is an intermediate liquid from said second column system, said heat pump cycle comprising:
  expanding said "heavy" impurity-enriched liquid to produce expanded "heavy" impurity-enriched liquid;
  at least partially vaporizing said expanded "heavy" impurity-enriched liquid by indirect heat exchange against said carbon dioxide-enriched overhead vapor to produce "heavy" impurity-enriched vapor and at least partially condensed carbon dioxide-enriched overhead vapor;
  compressing said "heavy" impurity-enriched vapor to produce compressed "heavy" impurity-enriched recycle vapor;
  cooling said compressed "heavy" impurity-enriched recycle vapor by indirect heat exchange to produce cooled "heavy" impurity-enriched recycle vapor; and
  feeding said cooled "heavy" impurity-enriched recycle vapor to said second column system,
  wherein said at least partially condensed carbon dioxide-enriched overhead vapor is used at least in part as said carbon dioxide-enriched liquid providing said reflux to said second column system.

37. A process according to #36, wherein said "heavy" impurity-enriched vapor is warmed by indirect heat exchange to produce warmed "heavy" impurity-enriched vapor prior to compression.

38. A process according to any of #1 to #38, wherein said "light" impurity-rich residual gas is warmed by indirect heat exchange and purged from said process.

39. A process according to any of #1 to #38, wherein said "light" impurity-rich residual gas is warmed by indirect heat exchange and added to carbon dioxide gas removed as product from said second column system.

40. A process according to any of #1 to #39, wherein at least one "light" impurity is selected from the group consisting of hydrogen; methane; C2 hydrocarbons; and mixtures thereof, said "light" impurity-rich residual vapor being used as a fuel for combustion to produce combustion product gas.

41. A process according to #41, wherein heat is recovered from said combustion product gas by indirect heat exchange.

42. A process according to any of #1 to #41, wherein said crude carbon dioxide fluid comprises carbon dioxide in an amount of at least about 50 mol %.

43. A process according to any of #1 to #42, wherein said crude carbon dioxide fluid comprises said at least one "light" impurity in an amount of no more than about 50 mol % in total.

44. A process according to any of #1 to #43, wherein said crude carbon dioxide fluid comprises said at least one "heavy" impurity in an amount of no more than about 50 mol % in total.

45. A process according to any of #1 to #44, wherein at least one "light" impurity is selected from the group consisting of nitrogen; oxygen; argon; neon; xenon; krypton; carbon monoxide; nitric oxide; nitrous oxide; hydrogen; helium; methane; and C2 hydrocarbons.

46. A process according to any of #1 to #45, wherein at least one "heavy" impurity is selected from the group consisting of hydrogen sulfide; methanol; C3 to C8 hydrocarbons; carbon disulfide; carbon oxysulfide; dimethyl sulfide and other organic sulfur compounds; nitrogen dioxide, sulfur dioxide; sulfur trioxide; and ammonia.

47. A process according to any of #1 to #46, wherein at least one "heavy" impurity is hydrogen sulfide.

48. A process according to #47, wherein at least one "light" impurity is selected from the group consisting of nitrogen; argon; helium; methane; and ethane.

49. A process according to any of #1 to #48, wherein said "light" impurity-rich residual gas comprises methane, nitrogen and helium, said process comprising rejecting nitrogen and helium from methane and recovering helium from the rejection process.

50. A process according to any of #1 to #49, wherein the operating pressure(s) of said first column system is from about 10 bar to about 60 bar, and preferably from about 30 bar to about 50 bar.

51. A process according to any of #1 to #50, wherein the operating pressure(s) of said second column system is from about 5.2 bar to about 40 bar, and preferably from 15 bar to about 25 bar.

52. A process according to any of #1 to #51, wherein the process is auto-refrigerated.

53. Apparatus for purifying crude carbon dioxide fluid comprising at least one "light" impurity and at least one "heavy" impurity, said apparatus comprising:
  a first heat exchanger for cooling said crude carbon dioxide fluid by indirect heat exchange to produce cooled crude carbon dioxide fluid;
  a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;
  a second column system in fluid flow communication with said first column system for separating said bottoms liquid from said first column system by mass transfer separation to produce carbon dioxide-enriched overhead vapor and bottoms liquid enriched with said heavy impurity;
  a second heat exchanger in fluid flow communication with said second column system for warming carbon dioxide-enriched overhead vapor from said second column system by indirect heat exchange to produce warmed carbon dioxide-enriched gas;
  a first compressor in fluid flow communication with said second heat exchanger for compressing said warmed carbon dioxide-enriched gas to produce compressed carbon dioxide-enriched recycle gas;
  a third heat exchanger in fluid flow communication with said first compressor for cooling and at least partially condensing said compressed carbon dioxide-enriched recycle gas by indirect heat exchange to form at least partially condensed carbon dioxide-enriched liquid;
  a first pressure reduction arrangement in fluid flow communication with said third heat exchanger for expanding said at least partially condensed carbon dioxide-enriched liquid;
  a conduit arrangement for providing at least partially condensed carbon dioxide-enriched liquid from said first pressure reduction arrangement to said second column system as reflux; and
  a carbon dioxide recovery system in fluid flow communication with said first column system for recovering carbon dioxide from said overhead vapor from said first column system to produce "light" impurity-rich residual gas and recovered carbon dioxide,
  wherein said third heat exchanger is arranged to re-boil said second column system by vaporizing "heavy" impurity-enriched liquid in or taken from said second column system by said indirect heat exchange against said condensing carbon dioxide recycle gas.

54. Apparatus for purifying crude carbon dioxide fluid comprising at least one "light" impurity and at least one "heavy" impurity, said apparatus comprising:
  a first heat exchanger for cooling said crude carbon dioxide fluid by indirect heat exchange to produce cooled crude carbon dioxide fluid;
  a first column system in fluid flow communication with said first heat exchanger for separating said cooled crude carbon dioxide fluid by mass transfer separation to produce "light" impurity-enriched overhead vapor and "light" impurity-depleted carbon dioxide bottoms liquid comprising said "heavy" components, said first column system comprising a first re-boiler for re-boiling by indirect heat exchange bottoms liquid produced by said first column system;
  a second column system in fluid flow communication with said first column system for separating said bottoms liquid from said first column system by mass transfer separation to produce carbon dioxide-enriched overhead vapor and bottoms liquid enriched with said heavy impurity;
  a first pressure reduction arrangement in fluid flow communication with said second column system for expanding "heavy" impurity-enriched liquid from said second column system to produce expanded "heavy" impurity-enriched liquid;
  a second heat exchanger in fluid flow communication with said first pressure reduction arrangement for at least partially vaporizing said expanded "heavy" impurity-enriched liquid by indirect heat exchange to produce expanded "heavy" impurity-enriched gas;
  a first compressor in fluid flow communication with said second heat exchanger for compressing said expanded "heavy" impurity-enriched gas to produce compressed "heavy" impurity-enriched recycle gas;
  a third heat exchanger in fluid flow communication with said first compressor for cooling said compressed "heavy" impurity-enriched recycle gas by indirect heat exchange to form cooled "heavy" impurity-enriched recycle gas;
  a conduit arrangement for feeding said cooled "heavy" impurity-enriched recycle gas from said third heat exchanger to said second column system; and
  a carbon dioxide recovery system in fluid flow communication with said first column system for recovering carbon dioxide from said overhead vapor from said first column system to produce "light" impurity-rich residual gas and recovered carbon dioxide, wherein said second heat exchanger is arranged to at least partially condense carbon dioxide-enriched overhead vapor from said second column system by said indirect heat exchange against said vaporizing expanded "heavy" impurity-enriched liquid.

55. Apparatus according to #53 or #54, wherein the apparatus further comprises a conduit arrangement for feeding recovered carbon dioxide from said carbon dioxide recovery system to said second column system for mass transfer separation.

56. Apparatus according to any of #53 to #55, wherein said apparatus comprises a second pressure reduction arrangement provided in said fluid flow communication between said first heat exchanger and said first column system for expanding said cooled crude carbon dioxide fluid.

57. Apparatus according to any of #53 to #56, wherein said apparatus comprises a fourth heat exchanger provided in said fluid flow communication between said first column system and said carbon dioxide recovery system for cooling said overhead vapor from said first column system by indirect heat exchange.

58. Apparatus according to any of #53 to #56, wherein said carbon dioxide recovery system comprises:
 a fifth heat exchanger in fluid flow communication with said first column system for partially condensing said overhead vapor from said first column system by indirect heat exchange; and
 a phase separator in fluid flow communication with said fifth heat exchanger for separating said "light" impurity-rich residual gas from said recovered carbon dioxide in the form of condensate.

59. Apparatus according to any of #53 to #56, wherein said carbon dioxide recovery system comprises:
 a wash column in fluid flow communication with said first column system for washing carbon dioxide and said "heavy" impurity from said overhead vapor from said first column system to produce said "light" impurity-rich residual gas and said recovered carbon dioxide; and
 a conduit arrangement for feeding carbon dioxide-enriched liquid from said second column system to said wash column.

60. Apparatus according to any of #53 to #59, wherein said second column system comprises:
 at least two distillation sections;
 an intermediate zone between adjacent distillation sections; and
 an inlet for feeding bottoms liquid from said first column system to said second column system at said intermediate zone.

61. Apparatus according to #60, wherein said third heat exchanger is arranged to re-boil liquid in or taken from said or another intermediate zone of said second column system.

62. Apparatus according to any of #53 to #61, wherein said apparatus comprises a third pressure reduction arrangement in said fluid flow communication between said first heat exchanger and said first column system for expanding said crude carbon dioxide fluid.

63. Apparatus according to any of #53 to #62, wherein said first re-boiler is at least a part of said first heat exchanger, said first heat exchanger being arranged to re-boil said bottoms liquid produced by said first column system by indirect heat exchange against said condensing crude carbon dioxide fluid.

64. Apparatus according to any of #53 to #62, wherein said first re-boiler is at least a part of said third heat exchanger, said third heat exchanger being arranged to re-boil said bottoms liquid produced by said first column system by indirect heat exchange against said condensing carbon dioxide fluid.

65. Apparatus according to any of #53 to #64, wherein said first column system comprises a distillation column system.

66. Apparatus according to any of #53 to #65, wherein said first column system comprises:
 a first distillation column system for separating crude carbon dioxide fluid into overhead vapor enriched in a first "light" impurity, and bottoms liquid depleted in said first "light" impurity, wherein said first distillation column system comprises a second re-boiler for re-boiling by indirect heat exchange bottoms liquid produced by said first distillation column system;
 a second distillation column system in fluid flow communication with said first distillation column system for separating bottoms liquid from said first distillation column system into said "light" impurity-enriched overhead vapor and said "light" impurity-depleted carbon dioxide bottoms liquid; and
 a conduit arrangement for providing bottoms liquid from said second distillation column system to said first distillation column system, preferably as reflux,
wherein said first re-boiler is arranged to re-boil said second distillation column system.

67. Apparatus according to #66, wherein said conduit arrangement for providing bottoms liquid from said second distillation column system to said first distillation column system comprises a first pump for pumping bottoms liquid from said second distillation column system to said first distillation column system.

68. Apparatus according to #66, wherein said apparatus comprises a conduit arrangement for providing carbon dioxide-enriched liquid from said second column system as reflux to said first distillation column system.

69. Apparatus according to #68, wherein said conduit arrangement for providing carbon dioxide-enriched liquid from said second column system to said first distillation column system comprises a second pump for pumping carbon dioxide liquid from said second column system to first distillation column system.

70. Apparatus according to any of #66 to #69, wherein said apparatus comprises a fourth pressure reduction arrangement in said fluid flow communication between said first and second distillation column systems for expanding said bottoms liquid from said first distillation column system prior to being fed to said second distillation column system.

71. Apparatus according to any of #53 to #70, wherein said apparatus comprises a sixth heat exchanger in said fluid flow communication between said first column system and said second column system for subcooling bottoms liquid from said first column system by indirect heat exchanger prior to feeding to said second column system.

72. Apparatus according to any of #53 to #71, wherein said apparatus comprises a fifth pressure reduction arrangement in said fluid flow communication between said first column system and said second column system for expanding bottoms liquid from said first column system prior to feeding to said second column system.

73. Apparatus according to any of #53 to #72, wherein said apparatus comprises a seventh heat exchanger in said fluid flow communication between said first column system and said second column system for vaporizing bottoms liquid from said first column system prior to feeding to said second column system.

74. Apparatus according to any of #53 to #73, comprising an eighth heat exchanger in said fluid flow communication between said second heat exchanger and said first compressor for warming said expanded "heavy" impurity-enriched gas to produce warmed expanded "heavy" impurity-enriched gas for compression.

COMPARATIVE EXAMPLE

The process depicted in FIG. 1A was modeled by computer using ASPEN™ Plus software (version 7.2; © Aspen Technology, Inc.) and the heat and mass balance data for key streams are provided in Table 1.

According to the modeling, the process of the comparative example recovers 99.3% of the carbon dioxide in the feed at a purity of 91.1 mol. %, and consumes about 23,775 kW of power in total. This figure represents the sum of the power required for compressors CP1 and CP3 (23,682 kW) and pumps P3 and P4 (92 kW).

EXAMPLE

The process depicted in FIG. 2 was modeled by computer using ASPEN™ Plus software (version 7.2; © Aspen Technology, Inc.) using measured vapor-liquid equilibrium data in the composition and pressure/temperature range of interest. The heat and mass balance data for key streams are provided in Table 2.

According to the modeling, the exemplified process recovers 95% of the carbon dioxide in the feed at a purity of 99 mol. %, and consumes about 17,074 kW of power in total. This figure represents the sum of the power required for compressors CP1 and CP3 (16,981 kW) and pumps P3 and P4 (93 kW). The exemplified process therefore saves 28.2% of the power of the comparative example (or 18.4% on a specific power basis), and also produces a higher purity product.

It should be noted that these figures do not take into account the power consumed by the conventional "light"

TABLE 1

| | | \multicolumn{12}{c|}{Stream No.} |
|---|---|---|---|---|---|---|---|---|---|---|---|---|---|
| | | 100 | 102 | 104 | 106 | 154 | 156 | 158 | 160 | 186 | 188 | 190 | 192 |
| Temperature | C. | 35.0 | −45.0 | −49.4 | −23.0 | | | | 50.0 | 5.7 | 9.2 | 37.5 | 47.6 |
| Pressure | bar | 60.0 | 59.2 | 19.8 | 19.5 | | | | 150.0 | 19.7 | 68.0 | 59.5 | 150.0 |
| Molar Flow | kmol/s | 2.000 | 2.000 | 2.000 | 2.000 | | | | 1.908 | 0.092 | 0.092 | 0.092 | 0.092 |
| Vap. Frac. | | 1.00 | 0.00 | 0.09 | 1.00 | | | | 1.00 | 0.00 | 0.00 | 0.00 | 0.00 |
| Mol. Frac. $CO_2$ | | 0.8750 | 0.8750 | 0.8750 | 0.8750 | | | | 0.9108 | 0.1341 | 0.1341 | 0.1341 | 0.1341 |
| Mol. Frac. $H_2S$ | | 0.0400 | 0.0400 | 0.0400 | 0.0400 | | | | 0.0000 | 0.8659 | 0.8659 | 0.8659 | 0.8659 |
| Mol. Frac. $CH_4$ | | 0.0400 | 0.0400 | 0.0400 | 0.0400 | | | | 0.0419 | 0.0000 | 0.0000 | 0.0000 | 0.0000 |
| Mol. Frac. $C_2H_6$ | | 0.0010 | 0.0010 | 0.0010 | 0.0010 | | | | 0.0010 | 0.0000 | 0.0000 | 0.0000 | 0.0000 |
| Mol. Frac. $N_2$ | | 0.0400 | 0.0400 | 0.0400 | 0.0400 | | | | 0.0419 | 0.0000 | 0.0000 | 0.0000 | 0.0000 |
| Mol. Frac. He | | 0.0040 | 0.0040 | 0.0040 | 0.0040 | | | | 0.0042 | 0.0000 | 0.0000 | 0.0000 | 0.0000 |

| | | \multicolumn{12}{c|}{Stream No.} |
|---|---|---|---|---|---|---|---|---|---|---|---|---|---|
| | | 110 | 112 | 140 | 142 | 120 | 122 | 200 | 204 | 180 | 182 | 170 | 172 |
| Temperature | C. | −24.2 | 37.5 | | | 50.0 | −28.4 | | | −8.4 | 5.7 | −19.2 | −18.7 |
| Pressure | bar | 19.3 | 18.8 | | | 30.2 | 29.7 | | | 19.9 | 19.7 | 19.7 | 19.5 |
| Molar Flow | kmol/s | 9.820 | 9.820 | | | 7.912 | 7.912 | | | 1.507 | 1.507 | 6.951 | 6.951 |
| Vap. Frac. | | 1.00 | 1.00 | | | 1.00 | 0.13 | | | 0.00 | 0.94 | 0.00 | 0.76 |
| Mol. Frac. $CO_2$ | | 0.9108 | 0.9108 | | | 0.9108 | 0.9108 | | | 0.3918 | 0.3918 | 0.9058 | 0.9058 |
| Mol. Frac. $H_2S$ | | 0.0000 | 0.0000 | | | 0.0000 | 0.0000 | | | 0.6082 | 0.6082 | 0.0942 | 0.0942 |
| Mol. Frac. $CH_4$ | | 0.0419 | 0.0419 | | | 0.0419 | 0.0419 | | | 0.0000 | 0.0000 | 0.0000 | 0.0000 |
| Mol. Frac. $C_2H_6$ | | 0.0010 | 0.0010 | | | 0.0010 | 0.0010 | | | 0.0000 | 0.0000 | 0.0000 | 0.0000 |
| Mol. Frac. $N_2$ | | 0.0419 | 0.0419 | | | 0.0419 | 0.0419 | | | 0.0000 | 0.0000 | 0.0000 | 0.0000 |
| Mol. Frac. He | | 0.0042 | 0.0042 | | | 0.0042 | 0.0042 | | | 0.0000 | 0.0000 | 0.0000 | 0.0000 |

| | |
|---|---|
| CP1 (sect. 1) | 14613 kW |
| CP1 (sect. 2) | 4306 kW |
| CP3 (sect. 3) | 2953 kW |
| CP3 (sect. 4) | 1810 kW |
| P3 | 26 kW |
| P4 | 66 kW |
| Total power | 23775 kW |
| Specific power | 12463 kJ/kmol |
| $CO_2$ recovery | 99.3% |
| $CO_2$ Purity | 91.1% | impurity removal process depicted in FIG. 1B. Therefore, the total and specific power savings of FIG. 2 would actually be significantly more than that indicated above if FIG. 1B were taken into account.

prior published document herein should be taken to be an admission or representation that the teaching thereof was common general knowledge in Australia or elsewhere at the date thereof.

TABLE 2

| | | \multicolumn{9}{c}{Stream No.} | | | | | | | | |
|---|---|---|---|---|---|---|---|---|---|---|
| | | 100 | 102 | 104 | 106 | 200 | 156 | 204 | 160 | 186 |
| Temperature | C. | 35.0 | −7.6 | −19.6 | −19.6 | −19.7 | −18.9 | 8.5 | 50.0 | 4.4 |
| Pressure | bar | 60.0 | 42.8 | 19.8 | 19.5 | 59.2 | 42.7 | 43.0 | 150.0 | 19.7 |
| Molar Flow | kmol/s | 2.000 | 1.624 | 1.624 | 1.624 | 2.000 | 0.376 | 1.624 | 1.679 | 0.092 |
| Vap. Frac. | | 1.00 | 0.00 | 0.09 | 1.00 | 0.01 | 1.00 | 0.00 | 1.00 | 0.00 |
| Mol. Frac. $CO_2$ | | 0.8750 | 0.9527 | 0.9527 | 0.9527 | 0.8750 | 0.5393 | 0.9527 | 0.9899 | 0.1486 |
| Mol. Frac. $H_2S$ | | 0.0400 | 0.0451 | 0.0451 | 0.0451 | 0.0400 | 0.0178 | 0.0451 | 0.0000 | 0.8514 |
| Mol. Frac. $CH_4$ | | 0.0400 | 0.0012 | 0.0012 | 0.0012 | 0.0400 | 0.2075 | 0.0012 | 0.0064 | 0.0000 |
| Mol. Frac. $C_2H_6$ | | 0.0010 | 0.0009 | 0.0009 | 0.0009 | 0.0010 | 0.0013 | 0.0009 | 0.0010 | 0.0000 |
| Mol. Frac. $N_2$ | | 0.0400 | 0.0000 | 0.0000 | 0.0000 | 0.0400 | 0.2129 | 0.0000 | 0.0026 | 0.0000 |
| Mol. Frac. He | | 0.0040 | 0.0000 | 0.0000 | 0.0000 | 0.0040 | 0.0213 | 0.0000 | 0.0000 | 0.0000 |

| | | \multicolumn{8}{c}{Stream No.} | | | | | | | |
|---|---|---|---|---|---|---|---|---|---|
| | | 188 | 190 | 192 | 110 | 112 | 140 | 142 | 120 |
| Temperature | C. | 7.9 | 40.4 | 51.0 | −21.0 | 40.4 | −37.5 | 40.4 | 50.0 |
| Pressure | bar | 68.0 | 59.5 | 150.0 | 19.3 | 18.8 | 42.5 | 42.2 | 25.2 |
| Molar Flow | kmol/s | 0.092 | 0.092 | 0.092 | 8.674 | 8.674 | 0.230 | 0.230 | 6.995 |
| Vap. Frac. | | 0.00 | 0.00 | 0.00 | 1.00 | 1.00 | 1.00 | 1.00 | 1.00 |
| Mol. Frac. $CO_2$ | | 0.1486 | 0.1486 | 0.1486 | 0.9899 | 0.9899 | 0.3249 | 0.3249 | 0.9899 |
| Mol. Frac. $H_2S$ | | 0.8514 | 0.8514 | 0.8514 | 0.0000 | 0.0000 | 0.0085 | 0.0085 | 0.0000 |
| Mol. Frac. $CH_4$ | | 0.0000 | 0.0000 | 0.0000 | 0.0064 | 0.0064 | 0.3014 | 0.3014 | 0.0064 |
| Mol. Frac. $C_2H_6$ | | 0.0000 | 0.0000 | 0.0000 | 0.0010 | 0.0010 | 0.0012 | 0.0012 | 0.0010 |
| Mol. Frac. $N_2$ | | 0.0000 | 0.0000 | 0.0000 | 0.0026 | 0.0026 | 0.3294 | 0.3294 | 0.0026 |
| Mol. Frac. He | | 0.0000 | 0.0000 | 0.0000 | 0.0000 | 0.0000 | 0.0346 | 0.0346 | 0.0000 |

| | | \multicolumn{8}{c}{Stream No.} | | | | | | | |
|---|---|---|---|---|---|---|---|---|---|
| | | 122 | 180 | 182 | 170 | 172 | 210 | 212 | 214 |
| Temperature | C. | −17.1 | −9.0 | 4.4 | −18.9 | −18.3 | −37.5 | −37.5 | −23.4 |
| Pressure | bar | 24.7 | 19.9 | 19.7 | 19.7 | 19.5 | 42.5 | 42.5 | 19.5 |
| Molar Flow | kmol/s | 6.995 | 1.095 | 1.095 | 6.708 | 6.708 | 0.376 | 0.146 | 0.146 |
| Vap. Frac. | | 0.00 | 0.00 | 0.92 | 0.00 | 0.82 | 0.61 | 0.00 | 1.00 |
| Mol. Frac. $CO_2$ | | 0.9899 | 0.4103 | 0.4103 | 0.8873 | 0.8873 | 0.5393 | 0.8767 | 0.8767 |
| Mol. Frac. $H_2S$ | | 0.0000 | 0.5897 | 0.5897 | 0.1127 | 0.1127 | 0.0178 | 0.0324 | 0.0324 |
| Mol. Frac. $CH_4$ | | 0.0064 | 0.0000 | 0.0000 | 0.0000 | 0.0000 | 0.2075 | 0.0597 | 0.0597 |
| Mol. Frac. $C_2H_6$ | | 0.0010 | 0.0000 | 0.0000 | 0.0000 | 0.0000 | 0.0013 | 0.0013 | 0.0013 |
| Mol. Frac. $N_2$ | | 0.0026 | 0.0000 | 0.0000 | 0.0000 | 0.0000 | 0.2129 | 0.0295 | 0.0295 |
| Mol. Frac. He | | 0.0000 | 0.0000 | 0.0000 | 0.0000 | 0.0000 | 0.0213 | 0.0004 | 0.0004 |

| | | |
|---|---|---|
| CP1 (sect. 1) | 8044 kW | |
| CP1 (sect. 2) | 5026 kW | |
| CP3 (sect. 3) | 2534 kW | |
| CP3 (sect. 4) | 1377 kW | 16981 |
| P3 | 26 kW | |
| P4 | 66 kW | 93 |
| Total power | 17074 kW | |
| Specific power | 10171 kJ/kmol | |
| $CO_2$ recovery | 95.0% | |
| $CO_2$ Purity | 99.0% | |

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference. No acknowledgement of any

The invention claimed is:

1. A process for purifying crude carbon dioxide fluid comprising at least one "light" impurity and at least one "heavy" impurity, said process comprising:
cooling said crude carbon dioxide fluid above the triple point pressure of carbon dioxide by indirect heat exchange to produce a cooled crude carbon dioxide fluid;
feeding said cooled crude carbon dioxide fluid to a first column system for mass transfer separation to produce a "light" impurity-enriched overhead vapor and a "light" impurity-depleted carbon dioxide bottoms liquid comprising said "heavy" impurity;

re-boiling said first column system by vaporizing a portion of said "light" impurity-depleted carbon dioxide bottoms liquid by indirect heat exchange to provide a vapor for said first column system;

feeding a further portion of said "light" impurity-depleted carbon dioxide bottoms liquid from said first column system to a second column system for mass transfer separation to produce a carbon dioxide-enriched overhead vapor and a "heavy" impurity-enriched bottoms liquid;

providing a carbon dioxide-enriched liquid as reflux for said second column system;

re-boiling said second column system by indirect heat exchange to provide a vapor for said second column system;

wherein said first and second column systems operate above the triple point pressure and below the critical pressure of carbon dioxide;

wherein said process comprises at least one heat pump cycle using as working fluid a portion of said carbon dioxide-enriched overhead vapor from said second column system;

wherein said second column system is re-boiled by at least partially vaporizing a portion of said "heavy" impurity-enriched liquid in or taken from said second column system by indirect heat exchange against said working fluid of said at least one heat pump cycle;

wherein said overhead vapor from said first column system comprises carbon dioxide and at least a portion of said carbon dioxide is recovered from said overhead vapor from said first column system to produce a "light" impurity-rich residual gas and a recovered carbon dioxide; and wherein said recovered carbon dioxide is fed to said second column system for mass transfer separation.

2. The process of claim 1, wherein said cooled crude carbon dioxide fluid is expanded prior to being fed to said first column system.

3. The process of claim 2, wherein said cooled crude carbon dioxide fluid is below the critical pressure of carbon dioxide prior to expansion.

4. The process of claim 1, wherein said overhead vapor from said first column system is cooled prior to said carbon dioxide recovery.

5. The process of claim 4, wherein said cooling of said overhead vapor from said first column system is by indirect heat exchange to condense carbon dioxide in the overhead vapor from said first column system which is recovered by phase separation.

6. The process of claim 1, wherein said second column system comprises at least two distillation sections and said further portion of said "light" impurity depleted carbon dioxide bottoms liquid from said first column system is fed to said second column system at an intermediate zone between adjacent distillation sections.

7. The process of claim 6, wherein said second column system is additionally re-boiled by vaporizing a liquid in or taken from said or another intermediate zone.

8. The process of claim 1, wherein said crude carbon dioxide fluid is either a vapor that is at least partially condensed during said cooling, or a supercritical fluid that is "pseudo-condensed" during said cooling, to produce said cooled crude carbon dioxide fluid.

9. The process of claim 8, wherein said cooled crude carbon dioxide fluid is expanded prior to being fed to said first column system.

10. The process of claim 8, wherein re-boil duty for said first column system is provided at least in part by indirect heat exchange against condensing, or pseudo-condensing, said crude carbon dioxide fluid.

11. The process of claim 1, wherein said first column system comprises a distillation column system, said cooled crude carbon dioxide fluid being fed to said distillation column system for distillation to produce said "light" impurity-enriched overhead vapor and said "light" impurity-depleted carbon dioxide bottoms liquid.

12. The process of claim 1, wherein said at least one "light" impurity comprises at least one first "light" impurity and at least one second "light" impurity, said first "light" impurity being more volatile than said second "light" impurity.

13. The process of claim 1, wherein said "light" impurity depleted carbon dioxide bottoms liquid from said first column system is subcooled prior to being fed to said second column system.

14. The process of claim 1, wherein said "light" impurity depleted carbon dioxide bottoms liquid from said first column system is expanded prior to being fed to said second column system.

15. The process of claim 14, wherein said "light" impurity depleted carbon dioxide bottoms liquid from said first column system is subcooled by indirect heat exchange prior to being expanded.

16. The process of claim 1, wherein said "light" impurity depleted carbon dioxide bottoms liquid from said first column system is at least partially vaporized prior to being fed to said second column system.

17. The process of claim 16, wherein said "light" impurity depleted carbon dioxide bottoms liquid from said first column system is subcooled by indirect heat exchange and optionally expanded prior to being at least partially vaporized.

18. The process of claim 16, wherein said "light" impurity depleted carbon dioxide bottoms liquid from said first column system is expanded prior to being at least partially vaporized.

19. The process of claim 1, wherein said heat pump cycle comprises:

warming said carbon dioxide-enriched overhead vapor from said second column system by indirect heat exchange to produce a warmed carbon dioxide-enriched gas;

compressing said carbon dioxide-enriched gas to produce a compressed carbon dioxide-enriched recycle gas;

using said compressed carbon dioxide-enriched recycle gas to provide at least a part of the reboil duty required to vaporize said "heavy" impurity-enriched bottoms liquid thereby cooling and at least partially condensing said compressed carbon dioxide-enriched recycle gas to produce a carbon dioxide-enriched liquid;

expanding said carbon dioxide-enriched liquid to produce expanded carbon dioxide-enriched liquid; and using at least a portion of said expanded carbon dioxide-enriched liquid to provide said reflux to said second column system.

20. The process of claim 1, wherein said "light" impurity-rich residual gas is warmed by indirect heat exchange and purged from said process.

21. The process of claim 1, wherein at least one "light" impurity is selected from the group consisting of hydrogen; methane; $C_2$ hydrocarbons; and mixtures thereof, said "light" impurity-rich residual vapor being used as a fuel for combustion to produce combustion product gas.

22. The process of claim 21, wherein heat is recovered from said combustion product gas by indirect heat exchange.

23. The process of claim 1, wherein said crude carbon dioxide fluid comprises carbon dioxide in an amount of at least 50 mol %.

24. The process of claim 1, wherein said crude carbon dioxide fluid comprises said at least one "light" impurity in an amount of no more than 50 mol % in total.

25. The process of claim 1, wherein said crude carbon dioxide fluid comprises said at least one "heavy" impurity in an amount of no more than 50 mol % in total.

26. The process of claim 1 wherein at least one "light" impurity is selected from the group consisting of nitrogen; oxygen; argon; neon; xenon; krypton; carbon monoxide; nitric oxide; nitrous oxide; hydrogen; helium; methane; and $C_2$ hydrocarbons.

27. The process of claim 1, wherein at least one "heavy" impurity is selected from the group consisting of hydrogen sulfide; methanol; $C_3$ to $C_8$ hydrocarbons; carbon disulfide; carbon oxysulfide; dimethyl sulfide and other organic sulfur compounds; nitrogen dioxide, sulfur dioxide; sulfur trioxide; and ammonia.

28. The process of claim 1, wherein at least one "heavy" impurity is hydrogen sulfide.

29. The process of claim 28, wherein at least one "light" impurity is selected from the group consisting of nitrogen; argon; helium; methane; and ethane.

30. The process of claim 1, wherein the operating pressure(s) of said first column system is from 10 bar to 60 bar.

31. The process of claim 1, wherein the operating pressure(s) of said second column system is from 5.2 bar to 40 bar.

32. The process of claim 1, wherein the process is auto-refrigerated.

33. The process of claim 1, wherein the operating pressure(s) of said first column system is from 30 bar to 50 bar.

34. The process of claim 1, wherein the operating pressure(s) of said second column system is from 15 bar to 25 bar.

* * * * *